US012529357B2

(12) United States Patent
Olsen

(10) Patent No.: US 12,529,357 B2
(45) Date of Patent: Jan. 20, 2026

(54) FLOATING FOUNDATION FOR WIND TURBINE GENERATORS

(71) Applicant: Niels Christian Olsen, Lye (NO)

(72) Inventor: Niels Christian Olsen, Lye (NO)

( * ) Notice: Subject to any disclaimer, the term of this patent is extended or adjusted under 35 U.S.C. 154(b) by 0 days.

(21) Appl. No.: 18/699,402

(22) PCT Filed: Oct. 7, 2022

(86) PCT No.: PCT/NO2022/050227
§ 371 (c)(1),
(2) Date: Apr. 8, 2024

(87) PCT Pub. No.: WO2023/059203
PCT Pub. Date: Apr. 13, 2023

(65) Prior Publication Data
US 2024/0410337 A1 Dec. 12, 2024

(30) Foreign Application Priority Data

Oct. 8, 2021 (NO) .................................. 20211211

(51) Int. Cl.
F03D 13/25 (2016.01)
B63B 43/14 (2006.01)
F03D 13/10 (2016.01)
B63B 35/44 (2006.01)

(52) U.S. Cl.
CPC .............. *F03D 13/25* (2016.05); *B63B 43/14* (2013.01); *F03D 13/126* (2023.08); *B63B 2035/446* (2013.01); *F05B 2230/6102* (2013.01); *F05B 2230/80* (2013.01); *F05B 2240/93* (2013.01); *F05B 2240/95* (2013.01)

(58) Field of Classification Search
None
See application file for complete search history.

(56) References Cited

U.S. PATENT DOCUMENTS

| 10,677,224 | B2 * | 6/2020 | Cruse | B63B 1/107 |
| 10,982,654 | B1 * | 4/2021 | Dehlsen | B63B 35/44 |
| 2005/0229836 | A1 * | 10/2005 | Borgen | E02D 27/42 |
| | | | | 114/264 |
| 2006/0165493 | A1 * | 7/2006 | Nim | F03D 13/25 |
| | | | | 405/223.1 |

OTHER PUBLICATIONS

Kokubu JP-2014025434-A + machine translation (Year: 2014).*

* cited by examiner

Primary Examiner — Juan G Flores
(74) Attorney, Agent, or Firm — Outlier Patent Attorneys, PLLC

(57) ABSTRACT

The invention relates to a floating foundation for wind turbine generators and a method for installing a wind turbine generator on top of and performing maintenance on said foundation. The floating foundation includes a tower and two support legs pivotally connected to the tower, forming a tripod-like structure. The floating foundation may include hydrodynamic damping elements and a single point mooring system leaving the foundation free to weathervane. The invention also relates to a method for using the structure as a crane, lowering and raising the turbine platform against and from e.g. a service barge during maintenance or assembly.

16 Claims, 20 Drawing Sheets

A - A

FLOATING FOUNDATION FOR WIND TURBINE GENERATORS

FIELD OF THE INVENTION

The invention relates to a floating offshore foundation for wind turbine generators, a method for installing a wind turbine generator on top of the floating foundation and a method for performing maintenance on the floating foundation and the installed wind turbine generator.

BACKGROUND

Floating offshore wind turbines have been known for several years and are commonly used as an alternative to land-based wind turbines and bottom fixed offshore wind turbines. Noise pollution is a common issue with land-based wind turbines affecting both wildlife and humans, and they may be considered aesthetically incompatible with their surrounding natural landscape. Also, it is difficult to obtain laminar wind flow conditions on land due to obstacles in the nearby terrain. Bottom fixed offshore wind turbines solve these issues in that they may be positioned a great distance away from land on a location with strong and more laminar wind flow conditions. However, their support structures become very expensive as the water depth increase. Therefore, the floating offshore wind turbines are advantageous in that they are not reliant on a large bottom fixed support structure but instead use a flexible mooring structure compatible with water depth over 60 meters.

Wind turbine towers and foundations are commonly assembled using a crane. Initial assembly can be done with an onshore crane and the whole assembly can afterwards be towed out to the operation site. On site, the foundation can be lowered by internal ballasting after which an offshore crane is used to mount the tower (section by section), nacelle, hub and rotor blades. It is common practice to have the nacelle substantially horizontally aligned during installation and during transport.

Green Entrans AS has published on their website a concept that simplifies offshore installation by towing a pre-assembled turbine out to the site and lowering it to seabed. However, this applies to a bottom fixed concept and requires a special vessel. Also, this nacelle is transported in an upright/almost vertical position. This may be problematic since many wind turbine generator producers will not deliver nacelles suitable to be transported in this position.

Floating offshore foundations for wind turbine generators are prone to hydrodynamic loading from waves and currents. Above sea level, the foundation is also exposed to wind forces. For floating foundations, the size its structural components exposed to waves, wind and currents determines how much hydrodynamical and aerodynamical forces are absorbed by the foundation. It is also well known that forces of waves and currents decrease with water depth. These forces may result in cyclical movement about the rotational centre of the floating foundation making the foundation less stable during operation.

Also, they result in stress, strain, and fatigue damage to the mooring system and to the components of the foundation and the wind turbine mounted to the foundation.

Some of the challenges with floating offshore wind structures today are costly and time consuming assembly and maintenance as well as scalability. Also, it is challenging to increase the stability of floating offshore foundations exposed to tall waves and heavy wind.

The present invention provides a cost saving and efficient method of assembling a wind turbine generator (WTG) to a foundation eliminating the need for large expensive cranes both on and offshore to lift tower sections, nacelle and rotor onto the foundation. Also, the present invention relates to a floating foundation structure for wind turbine generators, suitable for offshore conditions, providing increased stability during operation in offshore conditions, which is easy to assemble and deploy. The present invention provides a hydrodynamical and aerodynamical floating foundation having a slender support structure near sea level, and where bulkier components of the support structure are located well below sea level to reduce wave and drag forces. The floating foundation according to the invention can also receive a horizontally or vertically aligned nacelle during assembly or maintenance making it compatible with different types of nacelles and lifting utilities.

Some floating offshore concepts are extremely costly to scale up, and the costs may increase exponentially with the size of the concept. This invention can adapt to almost any WTG size and can be scaled to support small turbines or even the largest turbines on the market. Thus, this concept of this invention is very scalable.

The cost curve for this concept when scaled up in size is very favourable for this invention compared to floating foundations on the market today. One reason for this is that most of the forces in the foundation is absorbed as tension/compression, and not as bending moment. Thus, the floating foundation may be provided with lighter and slimmer support elements. Scalability is a relevant issue today, and there is a clear trend that the turbine size is increasing, so cost efficient scalability of a floating foundation concept is extremely important.

The present invention is a new floating offshore wind foundation concept, that has built-in crane functionality.

The crane functionality enables easy initial assembly of the WTG onto the foundation as well as preforming maintenance, (replacing large main components of the WTG, more specifically primarily blades, gear boxes, generator and transformer etc. smaller components can be hoisted down in a simpler way with internal cranes that already exist inside the nacelle).

Beside this crane functionality, the foundation concept works in a new way comparative to current industry standard, regarding how a floating foundation reacts to the wind loading coming from the WTG rotor, and how the foundation responds when waves that hit/collide with the main structural part or support legs.

The wave impact onto the foundation is smaller than conventional floating offshore wind foundation due to the reduced cross section area the foundation has in the SWL, compared to other known floating offshore wind foundation existing pr. today. This reduces the wave load impact achieved by having buoyancy elements well below the SWL and the small cross section in the SWL, the buoyancy elements well below the SWL is the primary contributor for creating static stability in no wind or non-operational mode.

During operation of the WTG the static equilibrium is archived by letting the support legs, "dive into the sea" this "dive in" can be large because of reduces cross section in the SWL. The "dive in" can be 10 to 20 meters or even more. Letting the support legs have such a large "dive in" allows the floating foundation to pivot forward 10 degrees or even more. The floating foundation also includes a tilting device able to keep the nacelle substantially horizontal when the foundation pivots. The tilting device can be used for many things/in many scenarios, during initial assembly of the WTG and to make the nacelle/WTG rot axis horizontal or nearly horizontal during operation due to the "dive in" of the support legs.

The tilting device is connected to the WTG and can be used to prevent build-up of vibrations, especially edgewise vibrations in the rotor blades, in the rotor plane during operation. The tilting device may alter the angle of incidence between the rotor axis of the WTG and the mean wind direction, so that the resonance conditions are changed. This alteration may avoid resonance and prevent oscillation amplitudes from exceeding acceptable levels. Furthermore, this may avoid emergency shutdown of the WTG due to dangerous vibration build-up.

Dynamic stability is achieved with damper plates mounted onto the buoyancy elements as well as the above mentioned fact that wave impact is smaller due to the reduced cross section area in the SWL of this foundation concept (For the same WTG size) compared to existing floating foundation existing on the market today.

SUMMARY OF THE INVENTION

The invention relates to a floating foundation, i.e. a floating support structure, for wind turbine generators comprising a tower, a first support leg pivotally connected to a midsection of the tower, and a second support leg pivotally connected to the midsection of the tower, means for connecting the first support leg to the second support leg, a first support leg buoyancy member fixed to a lower end of the first support leg adapted to be completely submerged, a second support leg buoyancy member fixed to a lower end of the second support leg adapted to be completely submerged; a tower buoyancy member fixed to a lower end of a tower adapted to be completely submerged, a mooring line connected to the floating foundation around which the floating foundation is adapted to weathervane, a nacelle platform on the top end of the tower for supporting a nacelle, a nacelle tilting device for tilting the nacelle platform and/or the nacelle.

The invention further relates to an abovementioned floating foundation, wherein, in operation, the angle between the tower and the first support leg is 20-100 degrees, and the angle between the tower and the second support leg is 20-100 degrees, and the angle between the first support leg and the second support leg is 20-100 degrees.

The invention further relates to an abovementioned floating foundation, wherein the means for connecting the first support leg to the second support leg comprises a support leg connection element connected to and extending between the first support leg (101) and the second support leg (101').

The invention further relates to an abovementioned floating foundation, wherein the means for connecting the first support leg to the second support leg comprises a lower auxiliary tension line connected to and extending between the first support leg buoyancy member and the second support leg buoyancy member.

The invention further relates to an abovementioned floating foundation including an auxiliary support leg connection system comprising a lateral support rod connected between a first sleeve connected to the first support leg and a second sleeve connected to the second support leg, and a support strut connected between the lateral support rod and the tower midsection.

The invention further relates to an abovementioned floating foundation including a support leg connection system comprising a first cantilever beam fixed to the first support leg, a second cantilever beam fixed to the second support leg, and a third cantilever beam fixed to the tower midsection, wherein the cantilever beams are releasably connected to each other via a pin lock element.

The invention further relates to an abovementioned floating foundation further comprising a first support leg buoyancy member damper connected to the first support leg buoyancy member, a second support leg buoyancy member damper connected to the second support leg buoyancy member, and a tower buoyancy member damper connected to the tower buoyancy member.

The invention further relates to an abovementioned floating foundation further comprising a first upper tension line connected to and extending between the tower and the first support leg above the waterline of the floating foundation, a second upper tension line connected to and extending between the tower and the second support leg above the waterline of the floating foundation.

The invention further relates to an abovementioned floating foundation further comprising a first lower tension line connected to and extending between the tower and the first support leg below the waterline of the floating foundation a second lower tension line connected to and extending between the tower and the second support leg below the waterline of the floating foundation.

The invention further relates to an abovementioned floating foundation wherein the distance between the lower tension lines and the upper tension lines is 25-50 meters and the distance between the waterline of the floating foundation and the lower tension lines is at least 5 meters.

The invention further relates to an abovementioned floating foundation further comprising a support leg stabilizer device adapted to couple and synchronize the pivoting motion of the support legs when either support leg is pivoted comprising a hydraulic damper for dampening the pivotal motion of the first support leg and the second support leg.

The invention further relates to an abovementioned floating foundation wherein the first support leg and the second support leg are respectively provided with a first rudder plate and a second rudder plate.

The invention also relates to a method of installing a wind turbine generator on top of the abovementioned floating foundation comprising the steps of towing the floating foundation close to a land based or a floating service platform, mooring the floating foundation to the service platform, lowering the tower towards the service platform and positioning the top end of the tower close to a surface of the service platform in reach of a crane, mounting a wind turbine generator to the top end of the tower, and raising the tower including the wind turbine generator.

The invention further relates to an abovementioned method, wherein the step of mooring the floating foundation to the service platform comprises mooring the first support leg to a first service platform winch mounted to the service platform with a first service platform mooring line, and mooring the second support leg to a second service platform winch mounted to the service platform with a second service platform mooring line.

The invention further relates to an abovementioned method, wherein the step of lowering the tower comprises disconnecting the first lower tension line, disconnecting the second lower tension line, disconnecting the first upper tension line, disconnecting the second upper tension line, removing the support leg connection element, releasing the first service platform mooring line and the second service platform mooring line simultaneously by actuating the first service platform winch and the second service platform winch.

The invention further relates to an abovementioned method, wherein the step of raising the tower comprises tensioning the first service platform mooring line and the second service platform mooring line simultaneously by actuating the first service platform winch and the second service platform winch.

The invention further relates to an abovementioned method, wherein the step of lowering the tower comprises reconnecting the first lower tension line, reconnecting the second lower tension line, reconnecting the first upper tension line, reconnecting the second upper tension line and mounting the support leg connection element.

The invention also further relates to a method of performing maintenance on a wind turbine generator on top of a floating foundation comprising the steps of towing the floating foundation close to a land based or a floating service platform, mooring the floating foundation to the service platform, ballasting the first support leg and the second support leg to that the floating foundation pivots forward thereby lowering the tower towards the service platform and positioning the top end of the tower close to a surface of the service platform in reach of a crane, performing maintenance on the wind turbine generator.

DETAILED DESCRIPTION

Figure 1:
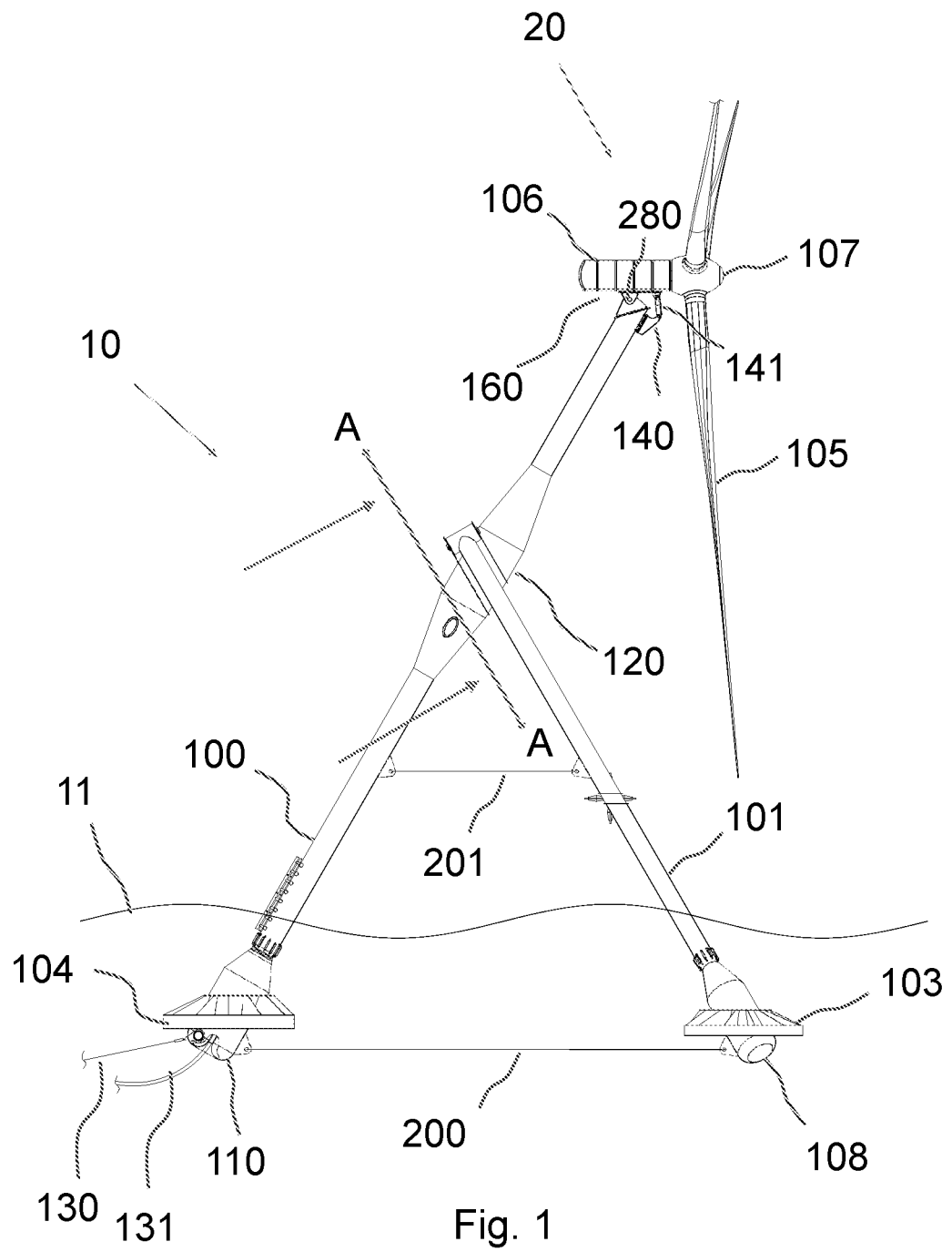
FIG. 1 is a side view of a floating foundation for wind turbine generators according to the invention.

FIG. 1 is a side view of a floating foundation 10 for wind turbine generators according to the invention. The floating foundation 10 supports a wind turbine generator 20 including a nacelle 106, a rotor hub 107 and at least one rotor blade 105, placed on the top end of the tower. A first support leg 101 and a second support leg 101' (shown in FIG. 2) is connected to a tower midsection 120 of the tower 100. The tower 100 and the two support legs 101, 101' form a tripod, a tetrahedral or tripod-like structure. As can be easily deducted from the figures, the volume between the tower 100, the first support leg 101 and the second support leg 101' is in the shape of a tetrahedron. When assembled and operational the tower 100 and the two support legs 101, 101' each have an angle of 20-100 degrees between them, i.e. the angle between the tower 100 and the first support leg 101 is 20-100 degrees, and the angle between the tower and the second support leg 101' is 20-100 degrees, and the angle between the first support leg 101 and the second support leg 101' is 20-100 degrees. The foundation has been illustrated with an angle of 60 degrees between the tower 100 and the support leg 101 in FIG. 1.

The support legs 101, 101' and the tower 100 may have a circular or elliptical cross-sectional profile. The support legs 101, 101' and/or the tower 100 can be made as a hollow shell structure/steel tube(s), that can have multiple ring stiffeners inside to keep the form stability, and may have an annular/circular cross-sectional profile.

To make the support legs 101, 101' and/or the tower 100 more aerodynamic, they may have an elliptical-, teardrop- or air foil shaped cross-sectional profile. A fibre shell structure with said shaped may be mounted outside the support legs 101, 101' and/or the tower 100. This may also reduce the wind deficit felt by the rotor blades 105, (primarily the outer portion of the blade) when they pass the wake of 101, 101' or 100.

The support legs 101, 101' and the tower 100 may be hollow and have an annular cross-sectional profile. The support legs 101, 101' and the tower 100 include an internal ballasting system and may be individually or simultaneously ballasted to provide adjust draft, increase updrift and/or to balance the draft of the two support legs 101, 101'. The support legs 101, 101' and the tower 100 are adapted to carry ballast water internally e.g. in tanks, internal compartments or cylindrical/annular compartments extending longitudinally within the hulls. At least one high capacity pump (not shown) in fluid connection with each ballast water compartment is provided, and is adapted to pump water out through an outlet to de-ballast one or more ballast water compartment. Each compartment is also in fluid connection with a sea water inlet located below the waterline of the floating foundation.

The tower 100 extends a distance above the tower midsection 120 and can be provided with a nacelle platform 160 on its top end. The nacelle platform 160 is adapted to support said nacelle 106. The length of the tower 100, the angle between the support legs 101, 101' and the tower 100, and the length of the rotor blades 105 are dimensioned so that the rotor blades may rotate 360 degrees about the nacelle's 106 longitudinal axis without colliding with the support legs 101, 101'.

An advantage of the foundation 10 when the WTG is run in a downwind configuration, is that the blades are deflecting away from the support legs 101 and 101'. This minimizes the chance that the blade(s) can collide with the support legs 101, 101' in high wind conditions. Because they will bend towards the right, i.e. away from the support legs 101, 101', as shown in FIG. 1.

Furthermore because of the large clearance between the blade 105 tip and the support legs 101 and 101' the need for the WTG blades to be prebend is reduced or completely removed, which reduces production costs for the blade(s) 105.

The floating foundation 10 floats at least by means of three buoyancy members. A first support leg buoyancy member 108 is fixed to the lower end of the first support leg 101. A second support leg buoyancy member 108' (shown in FIG. 2) is fixed to the lower end of the second support leg 101'. Also, a tower buoyancy member 110 is fixed to the lower end of the tower 100.

In operation, the buoyancy members 110, 108, 108' are adapted to be completely submerged below the water surface while providing updrift to the floating foundation 10. The tower 100 and the support legs 101, 101' typically have a smaller volume per meter than their buoyancy members 110, 108, 108'. However, the volume per meter of each buoyancy member 110, 108, 108' may also be identical to the tower 100 and the support legs 101, 101' respectively.

A first upper tension line 201 connects the tower 10 to the first support leg 101. A second upper tension line 201' (shown in FIG. 2) connects the tower 10 to the second support leg 101'. When the floating foundation 10 is assembled and deployed, the first upper tension line 201 and the second upper tension line 201' are located above the waterline of the floating foundation 10. A water surface 11 is illustrated in the enclosed figures which substantially corresponds to the waterline of the floating foundation 10. Each upper tension line 201, 201' prevents the support legs 101, 101' from drifting away from the tower 10 and may be e.g. a steel wire, a fibre rope, a synthetic fibre/wire rope (e.g. Dyneema rope), or a chain. To prevent slack lines, weights may be attached to each upper tension line 201, 201'.

A first lower tension line 200 connects the first support leg buoyancy member 108 to the tower buoyancy member 110. A second lower tension line 200' (shown in FIG. 2) connects the second support leg buoyancy member 108' to the tower buoyancy member 110. Each lower tension line prevents the support legs 101, 101' from drifting apart and may be e.g. a steel wire, a fibre rope, a synthetic fibre/wire rope (e.g. Dyneema rope), or a chain. A lower auxiliary tension line 290 (see FIG. 2) between the first support leg buoyancy member 108 and the second support leg buoyancy member 108' may also be provided to prevent the support legs 101, 101' from drifting apart e.g. in absence of a support leg connection element 202. To prevent slack lines, weights may be attached to each lower tension line 200, 200'.

A tower buoyancy member damper 104 can be attached to the tower buoyancy member 110. A first support leg buoyancy member damper 103 can be attached to the first support leg buoyancy member 108. A second support leg buoyancy member damper 103' can be attached to the second support leg buoyancy member 108'. The dampers 104, 103, 103' can be circular or elliptical plates with/without a flanged edge extending upwards and/or downwards along its circumference. The dampers 104, 103, 103' may also include radial flanges to increase the damping effect. The dampers 104, 103, 103' may also include small holes in strategic locations to enhance the damping effect. The dampers 104, 103, 103' have a larger diameter than the buoyancy members and provide an increased area that exerts a drag force acting against heave, pitch and roll movements of the floating foundation 10 as a result of environmental/external loads such as wind, waves and/or currents.

The diameters of the tower 100, and the support legs 101, 101' are significantly smaller than the diameters of the dampers 104, 103, 103', and typically also smaller than the diameters of their respective buoyancy members 110, 108, 108'. When the floating foundation 10 is in operation with zero wind conditions, the buoyancy members 110, 108, 108' and their respective buoyancy damper elements 104, 103', 103' are located well below sea level, and are therefore prone to less hydrodynamical forces than those occurring near sea level. The tower buoyancy member 110 is typically 10-40 meters below sea level, preferably over 50 meters below sea level (no wind and waves). The first support leg buoyancy member 108 and the second support leg buoyancy member 108' are typically located at a depth of 6-40 meters (no wind and waves). The hydro- and aerodynamical force occurring near sea level is substantially absorbed by the tower 100, and the support legs 101, 101' and the larger components such as the dampers 104, 103, 103' and the buoyancy members 110, 108, 108' are submerged well below sea level. This is advantageous in that the floating foundation 10 is provided with a slender structure at sea level while sheltering its bulkier components from sea level and the splash zone. This makes the floating foundation 10 more resistant to hydro- and aerodynamical forces than floating structures having thick and bulky structures near sea level.

Figure 17:
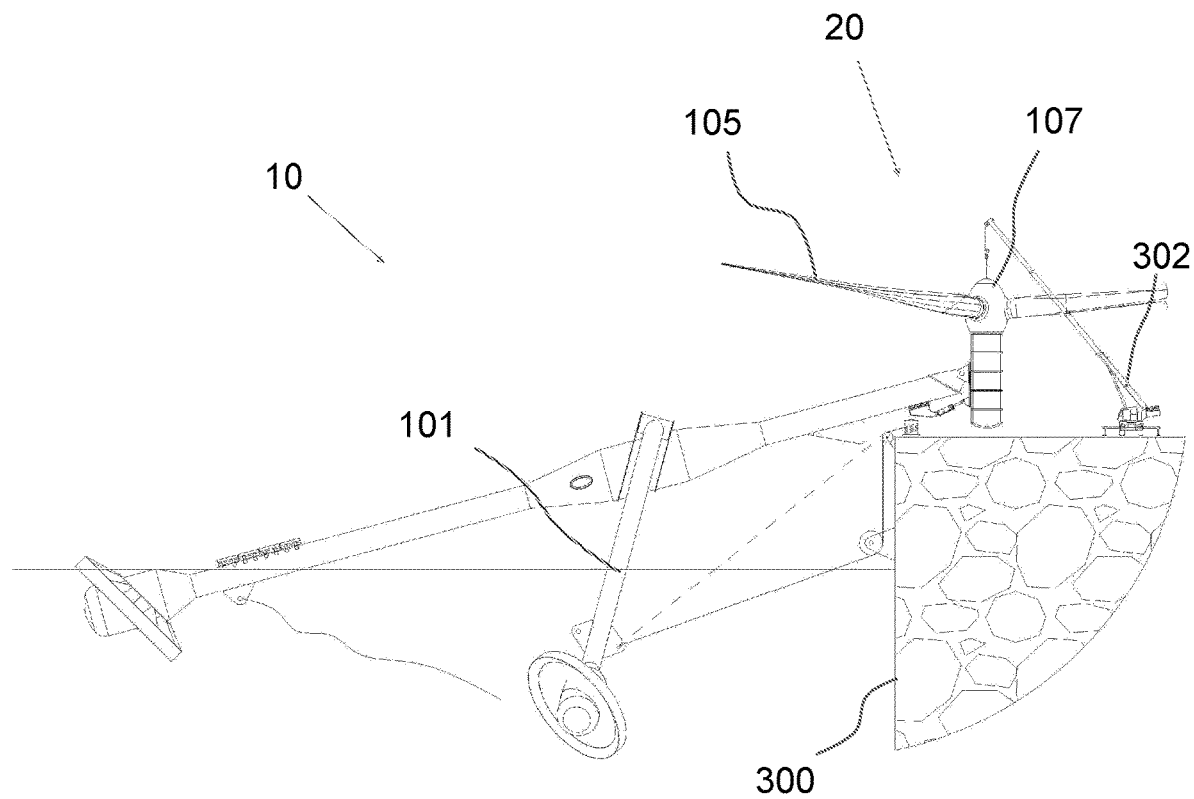
FIG. 17 is a side view of a floating foundation according to an embodiment of the invention mounted to a land based service platform during assembly or maintenance.
Figure 18:
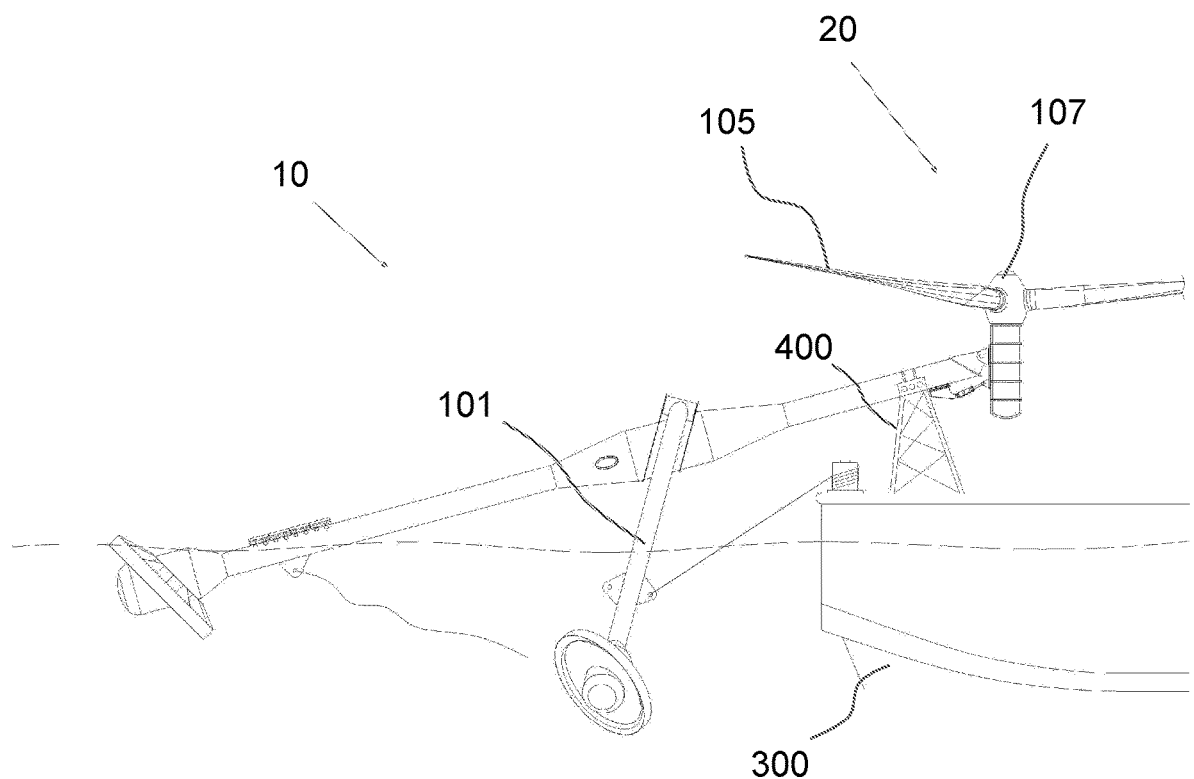
FIG. 18 is a side view of the floating foundation of FIG. 17 mounted to a floating service platform during assembly or maintenance.

The wind turbine generator 20 is a downwind turbine, i.e. the rotor hub 107 is positioned on the lee side of the tower. This is advantageous in that it does not need a yaw mechanism to face the wind. A yaw mechanism may still be provided to finetune stability during operation or to be able to position the rotor vertically during assembly or maintenance as seen in FIGS. 17 and 18. Also, the turbine blades 105 are not required to be as rigid as for upwind turbines which allows the prebend of the blade(s) 105 to be reduced, and maybe completely omitted in order to save production costs. The floating foundation 10 is moored to the seabed via a mooring line 130 connected to a single point on the floating foundation 10 e.g. the tower buoyancy member 110 as shown in FIG. 1, or to a location above the tower buoyancy member 110. This mooring system functions as a single point mooring (SPM) about which it weathervanes. Also, a power cable 131 is provided and extends through the inside of the tower 100 and is connected to the nacelle 106 for conveying electricity and data signals to/from the wind turbine generator 20. A swivel based mooring system (not shown) may be provided for avoiding axial rotation of the power cable 131 and the mooring line 130. The swivel based mooring system may be integrated into a lower part of the floating foundation 10. The swivel based mooring system may also be a floating external system such as a buoy turret mooring (BTM). The power cable 131 can be a multi-cable comprising both data cables and power cables, or it can be a bundle of separate cables comprising power and data cables. The power cable 131 may enter the tower 100 at the lower end of the tower, through the tower buoyancy element 110, as seen in FIG. 1, or it may enter the tower 100 through the side of the tower 100 at a location between the buoyancy element 110 and the tower midsection 120, e.g. through a J-tube connected to the side of the tower 100 (not shown). The way the power cable 131 enters the tower is determined by the type of mooring system used, and may accommodate both integrated and external single point mooring systems.

The floating foundation 10 also includes a nacelle tilting device 140 comprising hydraulic cylinders 141 for tilting the nacelle platform 160 and/or the nacelle 106 upwards, downwards or sideways (pitch and yaw) by means of the hydraulic cylinders 141 in order for the nacelle 106 to maintain a substantially horizontal position in operation, during assembly or during scheduled or non-scheduled maintenance. The hydraulic cylinders 141 may be located at the top end of the tower 100 and may be connected the nacelle platform 160 or directly to the nacelle 106. As seen in FIG. 1, the top end of the tower 100 is provided with hydraulic cylinders 140 and a tilting joint 280 about which the nacelle 106 may rotate. The tilting joint 280 may support the nacelle platform 160 or the nacelle 106 directly. The nacelle tilting device 140 can also be used dynamically to reduce wind loads or reduce unwanted vibrations in the rotor to an acceptable level or remove unwanted vibrations completely. The nacelle tilting device 140 can be used to remove unwanted vibrations in the foundation 10, primarily originating from the WTG rotor. The nacelle tilting device 140 may alter the angle of incidence between the rotor axis of the nacelle 106 and the mean wind direction, so that the resonance conditions are changed. This may avoid resonance and prevents oscillation amplitudes from exceeding acceptable levels. One way cyclic loads can be introduced into the foundation 10 is because of wind shear. Thus, it might be advantageous to tilt the nacelle tilting device 140 such a way that the cyclic loads originating from wind shear is reduced or completely removed. The nacelle tilting device 140 is connected to and actuated by a controller that receives input from an inclinometer or inclination sensor, vibration sensors, wind sensors etc. e.g. located in the nacelle 106 or in the floating foundation 10 (not shown). The controller may execute pre-programmed algorithms for actuating the device to operate as desired. The nacelle tilting device 140 is adapted to be autonomously operated. The nacelle 106 can also be mounted directly to the nacelle tilting device 141, in which case the nacelle tilting device 140 is directly connected to the nacelle 106. The nacelle tilting device 140 can be actuated by at least one hydraulic cylinder 141, but advantageously two or more hydraulic cylinders 141 in case one of them becomes redundant. The preferred number of parallel coupled hydraulic actuators are three. These hydraulic cylinders are controlled by a controller device (not shown) that receives input from motion sensors, (positions, speeds, accelerations and/or their angular equivalents (not shown). These motion sensors can be located in the nacelle 106 or in the floating foundation 10.

All components of the floating foundation 10 and the wind turbine 20 can be internally or externally powered. The nacelle tilting device 140 can also be used as a shaking device to shake the nacelle and rotor in order to prevent build-up of edgewise vibrations in the rotor plane or remove standing waves of the rotor blades 105.

Once vibrations have been eliminated or brought down to an acceptable level it returns to normal operational mode which is to keep the nacelle 106 in substantially horizontal position. If the shaking does not have the wanted effect, new algorithms executed by the controller, with a different frequency spectrum and force amplitude, may be applied.

The nacelle tilting device 140 is applying the shaking sequence around the "found" optimum position. The first setpoint is keeping the nacelle 106 in a substantially horizontal position, but further load reducing can be achieved by tilting the nacelle downwards if the foundation is used in the downwind configuration, meaning the blade 105 in FIG. 1, looking at the tip of the blade when it's top position, moves towards the right, thus reducing the cyclic blade bending moment due to wind shear. If the foundation 10 is used in an upwind configuration the tilting device 140 would have to tilt upwards so the tip of the blade that's in a top position moves to the left.

Thus, to find the optimal operation position seen from a load point of view, the shaking algorithm device can be applied symmetrically around this optimum set point. Alternatively, eliminating the vibrations by applying the algorithm symmetrically around non optimal set points is also possible.

The controller which controls the hydraulic cylinders 141 should have enough of different algorithms to choose from, so that it inevitably would eliminate all vibration build up or existing vibrations in the rotor plane/foundation, also standing wave of the blades 105.

Figure 2:
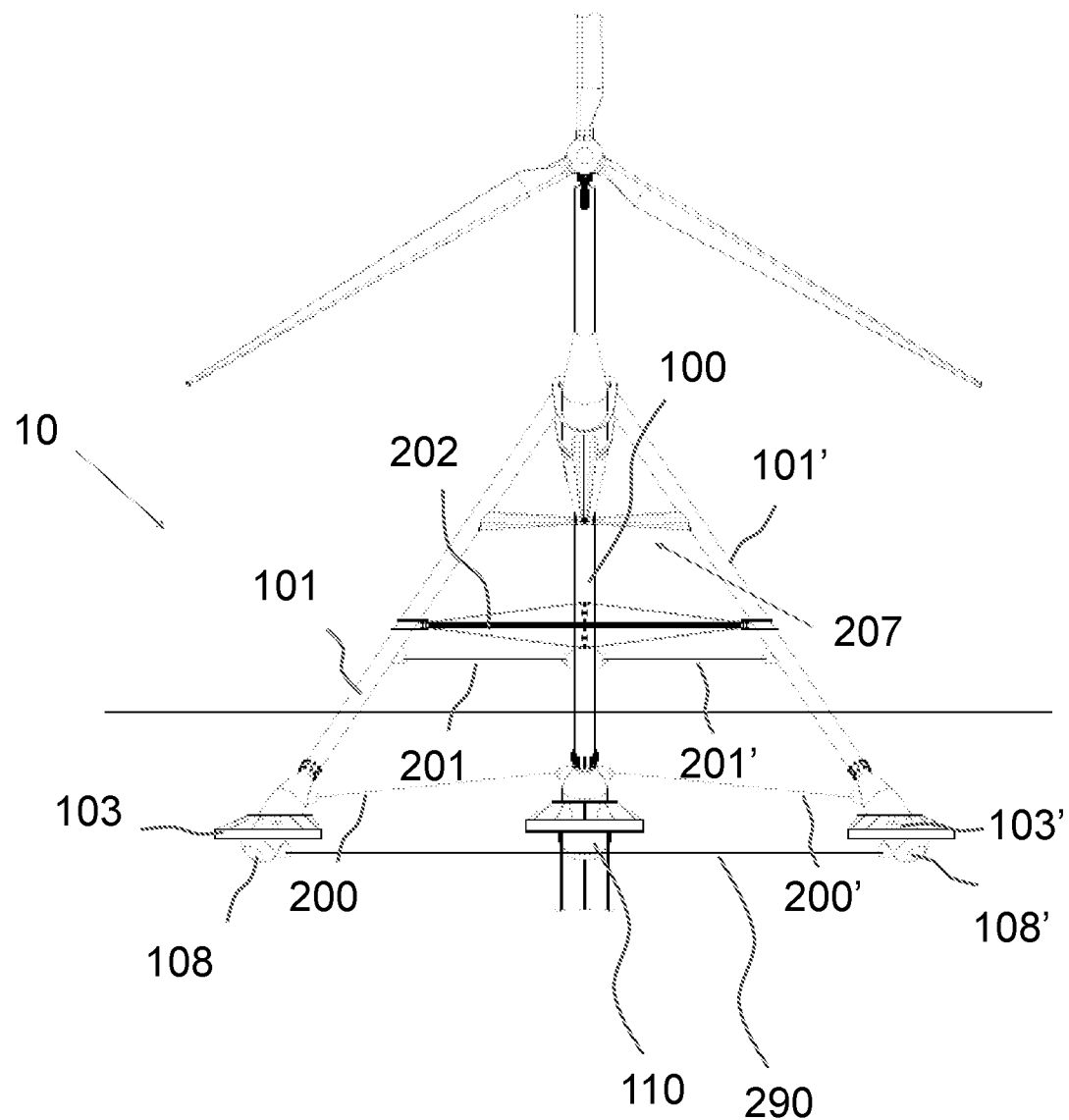
FIG. 2 is a front view of FIG. 1.

FIG. 2 is a front view of the floating foundation 10 of FIG. 1 disclosing the first support leg 101 and the second support leg 101', the first upper tension line 201 extending between the first support leg 101 and the tower 100, and the second upper tension line 201' extending between the second support leg 101' and the tower 100. FIG. 2 further shows the first lower tension line 200 extending between the first support leg buoyancy member 108 and the tower buoyancy member 110, and the second lower tension line 200' extending between the second support leg buoyancy member 108' and the tower buoyancy member 110. FIG. 2 also shows a support leg connection element 202 connected to and extending between the first and second support leg 101, 101'. The support leg connection element operates as a spacing element preventing the support legs 101, 101' both from drifting apart and from moving towards each other.

FIG. 2 further shows a lower auxiliary tension line 290 connecting the first support leg buoyancy member 108 and the second support leg buoyancy member 108' to prevent the support legs 101, 101' from drifting apart e.g. in absence of a support leg connection element 202. Weights may be attached to the lower auxiliary tension line 290 to prevent slack.

Figure 3:
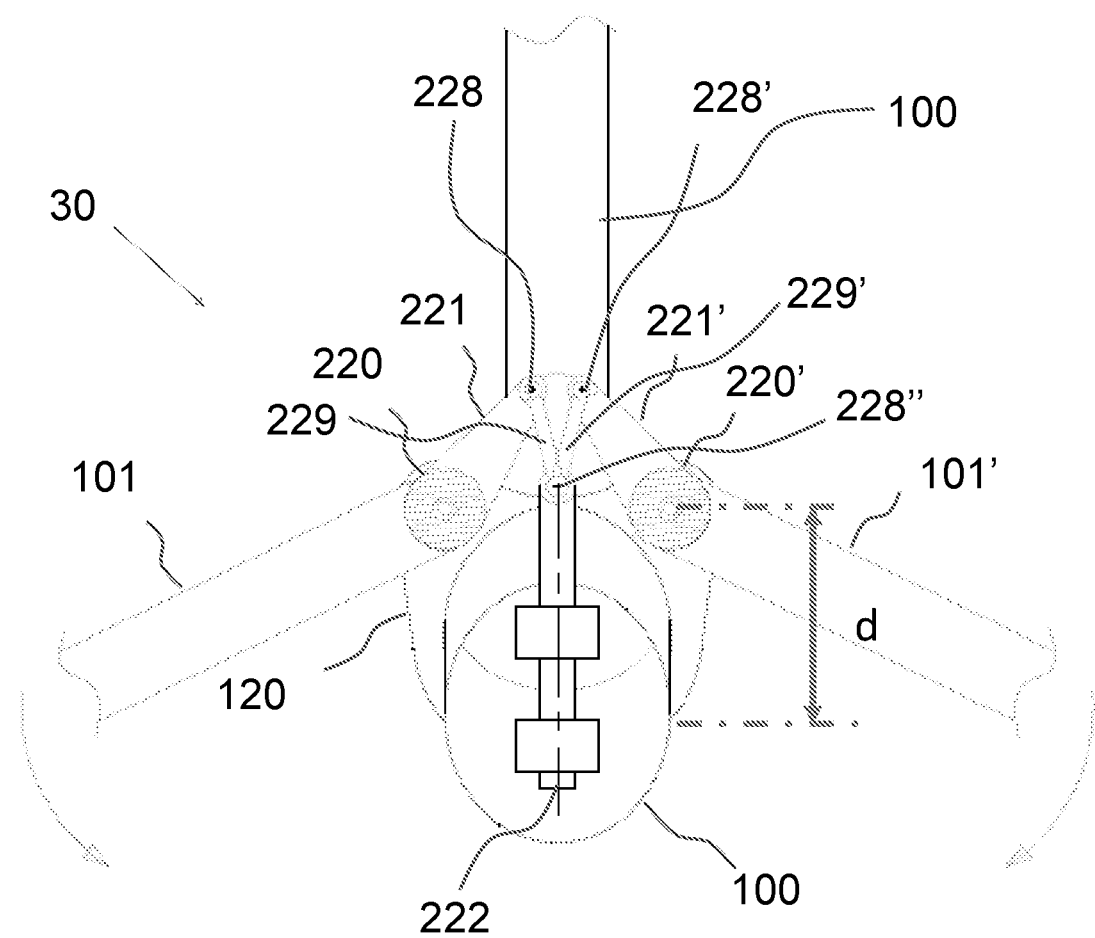
FIG. 3 shows cross section A-A indicated in FIG. 1

FIG. 3 shows cross section A-A indicated in FIG. 1. FIG. 3 shows the tower midsection 120 and the tower 100 in an embodiment of the invention. In this embodiment, the tower midsection 120 includes a support leg stabilizer device 30 comprising first support leg pin joint 220, a second support leg pin joint 220', a first pin joint arm 221, a second pin joint arm 221', a first auxiliary pin joint 228, a second auxiliary pin joint 228', a third auxiliary pin joint 228", a first auxiliary rod 229, a second auxiliary rod 229' and a hydraulic damper.

The first support leg 101 is connected to the tower midsection 120 via a first support leg pin joint 220 about which the first support leg 101 may pivot. The second support leg 101' is connected to the tower midsection 120 via a second support leg pin joint 220' about which the second support leg 101' may pivot.

FIG. 3 further shows that each pin joint 220, 220' is located a distance d above the centre axis of the tower 100 providing a more stable structure. The first support leg pin joint 220 is pivotally connected to a first pin joint arm 221. The second support leg pin joint 220' is pivotally connected to a second pin joint arm 221'. The first pin joint arm 221 is connected to a first auxiliary pin joint 228. The second pin joint arm 221' is connected to a second auxiliary pin joint 228'. The first auxiliary pin joint 228 is pivotally connected to a first auxiliary rod 229. The second auxiliary pin joint 228' is pivotally connected to a second auxiliary rod 229'. Both the first auxiliary rod 229 and the second auxiliary rod 229' are connected to a third auxiliary pin joint 228". The third auxiliary pin joint 228" is connected to a hydraulic damper 222.

The hydraulic damper 222 is located within the tower 100. When the support legs 101, 101' are rapidly tilted about their support leg pin joints 220, 221', the tilting movement is mechanically transferred to linear movement in the hydraulic damper 222 thus dampening the tilting motion of the support legs 101, 101'. This increases stability when the floating foundation 10 e.g., when subjected to waves. The support leg stabilizer device 30 can also be used to remove or dampen oscillations that exist along the centroid of tower part of the foundation if such oscillations occur or tend to build up.

The support leg stabilizer device 30 couples the support legs 101, 101' together and ensures that the support legs 101, 101' pivots simultaneously relative to the symmetry plane of the foundation and ensures that the angles between the longitudinal axis of each support leg 101, 101' and the symmetry plane of the foundation are equal. This allows lowering of the foundation 10 in a fully controlled manner.

Figure 4:
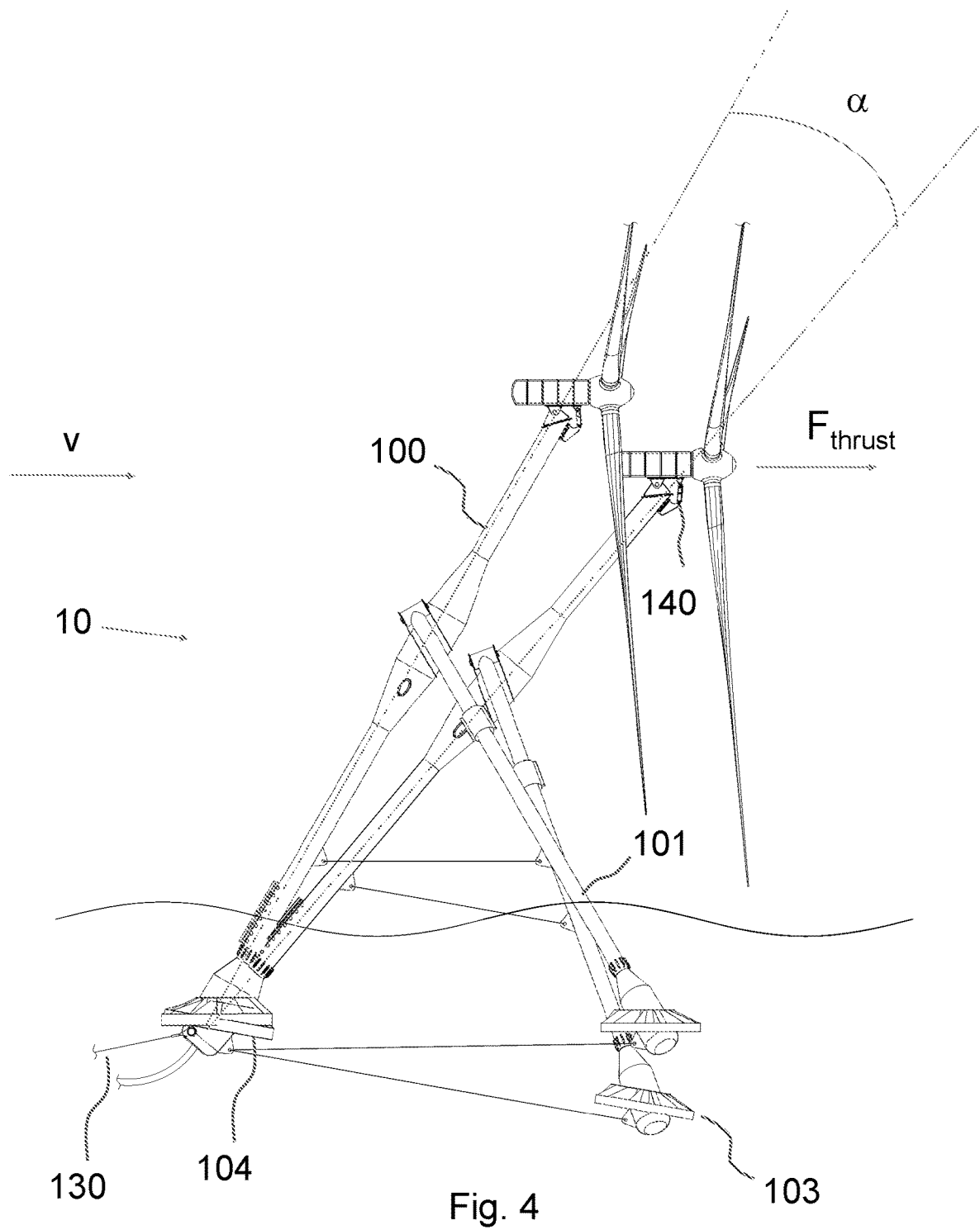
FIG. 4 is a side view of a floating foundation according to the invention in operation.

FIG. 4 is a side view of the floating foundation 10 according to the invention in operation. The figure illustrates a movement of the floating foundation 10 in two stages with different wind conditions. In a first stage, where the floating foundation 10 is in its most upright position, the mean wind speed is low or zero. In the second stage, the mean wind speed is substantially higher than in the first stage and the floating foundation 10 is pivoted a degrees forward. FIG. 4 has been shown with a 10 degree rotation.

The applied wind force is converted to torque and rotational speed in the rotor and induces a resultant thrust force $F_{thrust}$ aligned substantially parallel to the longitudinal axis of the rotor hub 107 which forces the floating foundation 10 to drift along the wind direction. The mooring line 130 will resist this movement, and as a result the floating foundation 10 is pivoted forward at an angle α causing the support legs 101, 101' (see FIG. 2) to dive deeper into the water as shown in FIG. 4. Effectively, the first support leg buoyancy member damper 103 and the second support leg buoyancy member damper 103' (see FIG. 2) will dive deeper as the wind increases. It is well known that the wave height increases as the wind increases, and that the wave motion is at its largest at the water surface. As the dampers 103, 103' dive deeper, they are subjected to less wave motion and therefore damping efficiency is increased. This provides even more resistance against heave, pitch and roll movements for the floating foundation 10. Also, when the support legs 101, 101' (see FIG. 2) to dive deeper into the water, they become increasingly vertically aligned with the sea surface making them less prone to resultant wave forces in the vertical direction thus reducing heave motion in the floating foundation 10.

FIG. 4 also shows how the nacelle tilting device 140 assists in maintain a substantially horizontal position during operation. In the second stage the floating foundation 10 is pivoted forward an angle of α. A controller connected to a sensor (not shown) thereafter instructs the nacelle tilting device 140 to tilt the nacelle 106 upwards to counteract the pivoting movement of the floating foundation 10, effectively holding the nacelle 106 in a horizontal position. As clearly shown in FIG. 4, the nacelle 106 is horizontally aligned in both stages despite of the pivot angle α. This is advantageous in that the nacelle 106 is held stable in its optimal position e.g. with regards to the wind turbine efficiency and reduction of cyclic loadings.

Figure 5:
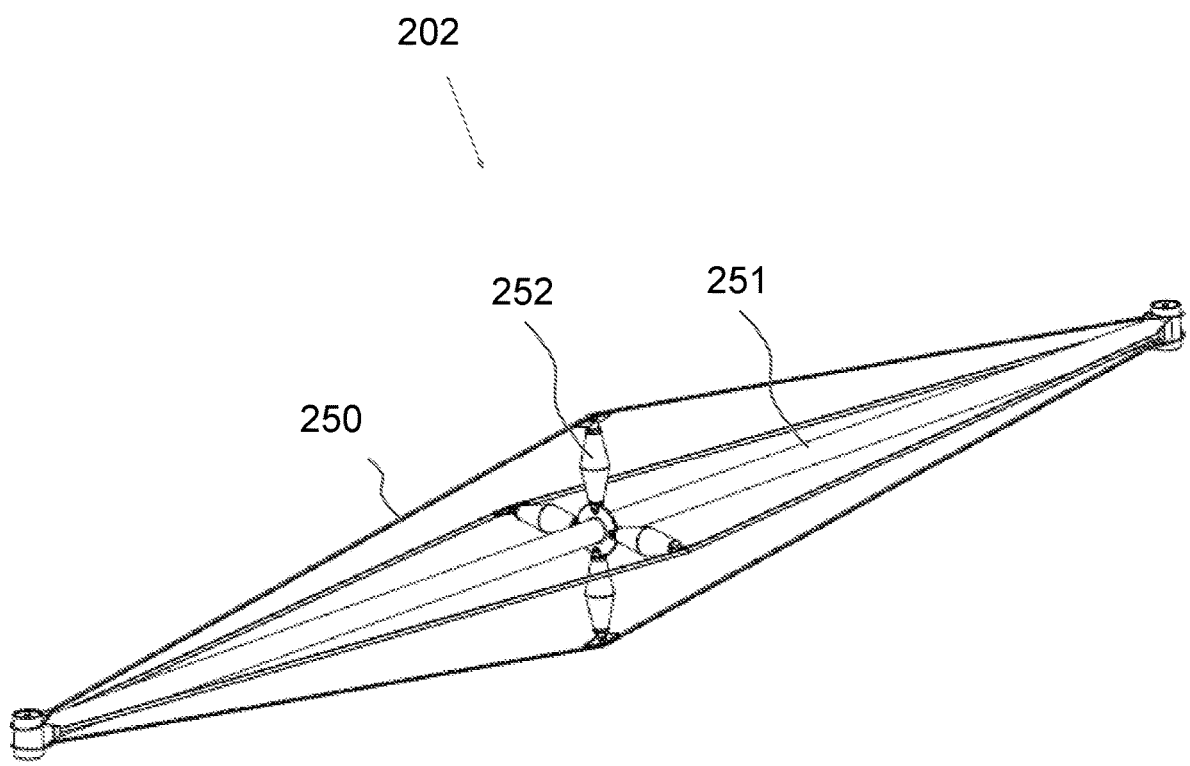
FIG. 5 is a perspective view of a support leg connection element of the invention.

FIG. 5 is a perspective view of a support leg connection element 202 of the invention including four tension lines 250 and a central pressure rod 251. The tension lines 250 are spaced apart from the central pressure rod 251 via four spacers 252 thereby tensioning the tension lines 250. The support leg connection element 202 is therefore adapted to absorb both tension and compression. The spacers 252 can be extended or retracted to respectively increase or decrease tension in the tension lines 250.

Figure 6:
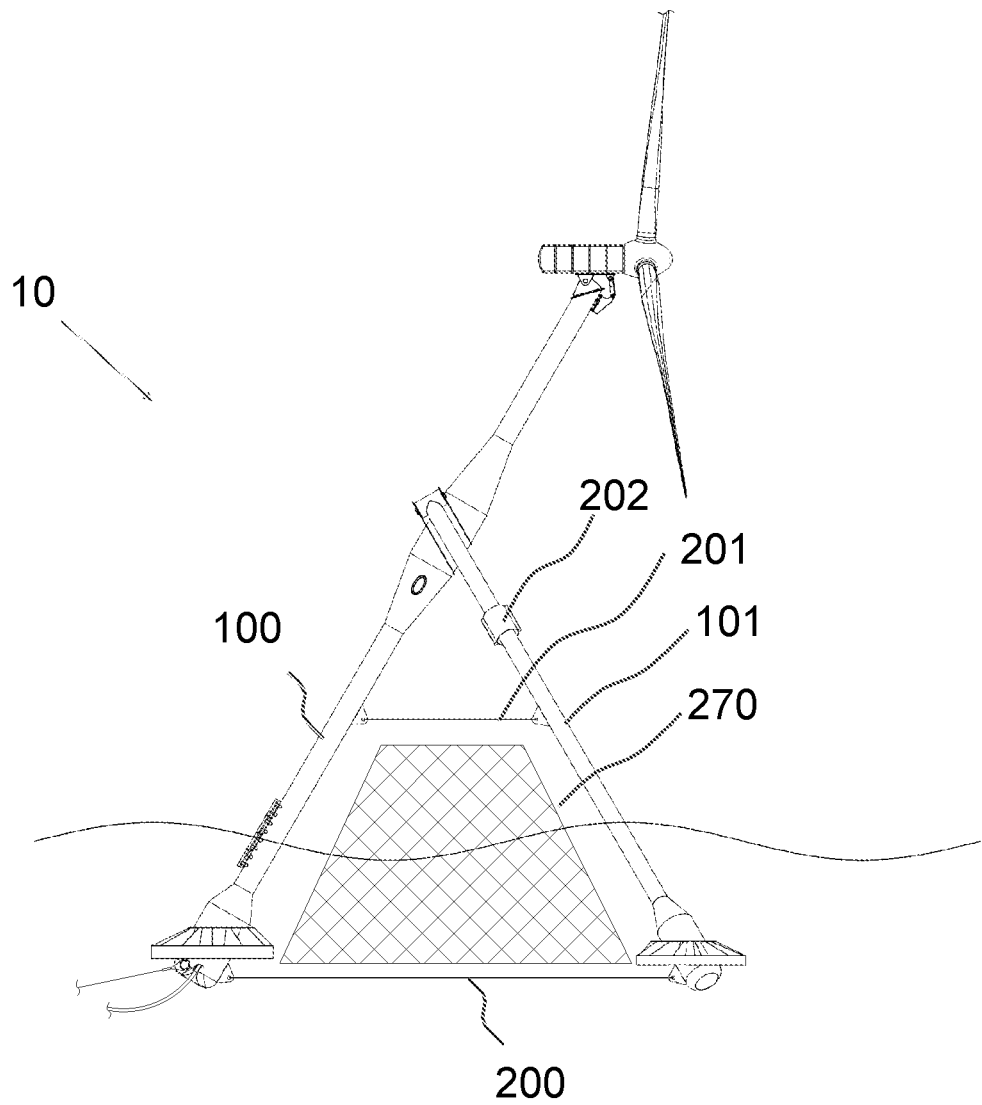
FIG. 6 is a side view of the floating foundation of the invention showing a ship clearance area.

FIG. 6 is a side view of the floating foundation 10 showing a ship clearance area 270 between the tower 100 and the support legs 101, 101' (see also FIG. 2). Ships of great height and draft can pass through the clearance area 220. The components of the floating foundation 10 surrounding the ship clearance area 220 may be adjusted, and the floating foundation 10 may be dimensioned so that the ship clearance area 220 allows for ships to pass between the tower 100 and the support legs 101, 101', under the upper tension lines 201, 201' and the support leg connection element 202, above the lower tension lines 200, 200', and between the support legs 101, 101' of the foundation according to national standards for floating offshore structures. The distance between the lower tension lines and the upper tension lines can be 25-50 meters.

Figure 7:
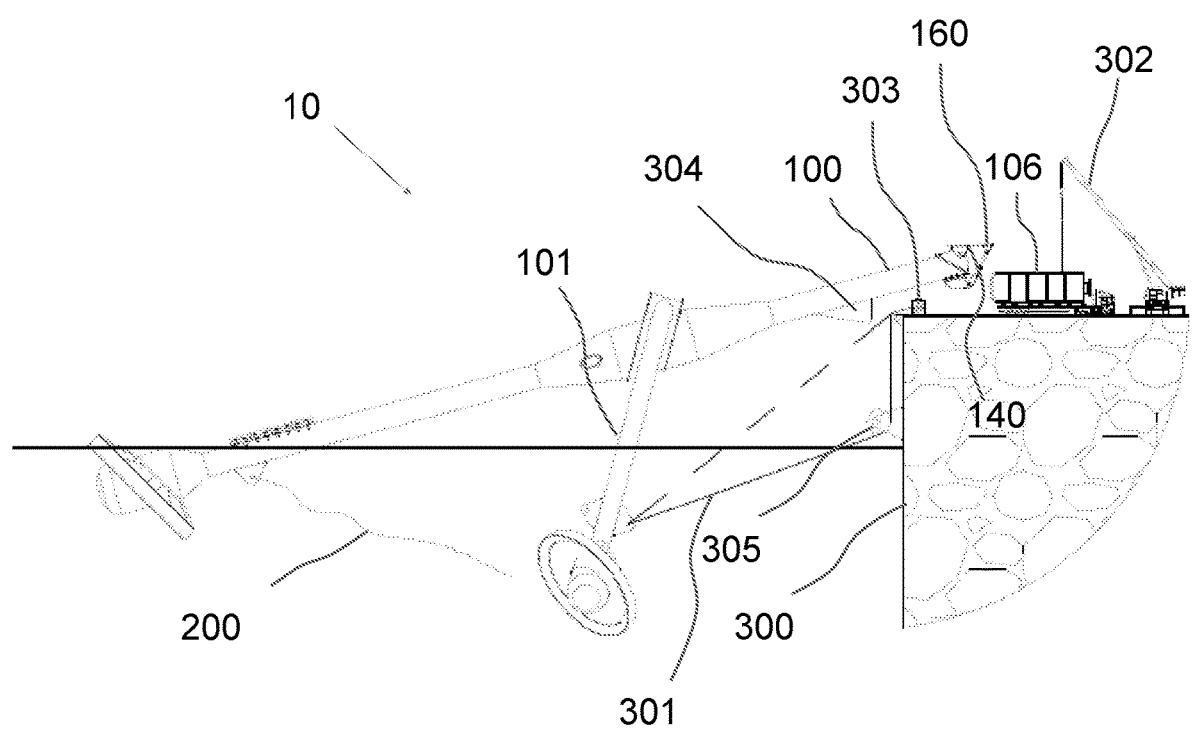
FIG. 7 is a side view of the floating foundation while installing a wind turbine generator on top of the floating foundation according to the invention.

FIG. 7 is a side view of the floating foundation 10 while installing a wind turbine generator on top of the floating foundation 10. Before installing the wind turbine generator, the floating foundation 10 is assembled, set afloat, and towed to a land based or floating service platform 300 such as a pier, dock, quay, jetty, barge or vessel. In FIGS. 7-11, a land based service platform 300 is shown. This assembly and towing process is not shown. Also, the tower is provided with a protection element 304 for protecting the tower 100 from moving towards the service platform 300, because of wire forces that exist between the support legs and the winches mounted on the service platform, there will be an horizontal force component that will try and pull the foundation towards to service platform 300.

The protection element 304 prevents the whole foundation 10 from moving towards the service platform 300 due to tension in the pulling/tension wires 301 and 301'. The stopper device 304, can be a permanent part of the foundation or a temporary device that only is mounted when crane functionality of the foundation 10 is used together with a pier, dock, quay or jetty. A similar device is available on the foundation when it's crane functionality is used together with a vessel offshore.

After the floating foundation 10 is positioned close to the service platform 300, the first and the second leg 101, 101' are secured to the service platform 300 by means by a first service platform mooring line 301 and a second service platform mooring line 301' (not shown). The first service platform mooring line 301 is connected to a first service platform winch 303 and runs freely through at least one first service platform pulley 305 fixed to the service platform 300, via a bracket on the lower end of the first support leg 101 and back to the service platform 300 where it is fixed. The second service platform mooring line 301' is connected to a second service platform winch 303' (shown in FIG. 13) and runs freely through at least one second service platform pulley 305' fixed to the service platform 300, via a bracket on the lower end of the second support leg 101' (not shown) and back to the service platform 300 where it is fixed. The service platform mooring lines 301, 301' can also go directly from the winches 303, 303' to the support legs 101 and 101' without the use of service platform pulleys 305, 305'.

After the first and the second support legs 101, 101' are secured to the service platform 300, the service platform mooring lines 301, 301' are tensioned by the winches 303, 303' and the tension lines 200, 200', 201, 201' (see FIG. 1) are disconnected/detensioned. The support leg connection element 202 is also removed/disconnected. If the foundation is provided with a support leg connection system 203 or an alternative support leg connection system 207 (see FIGS. 14 and 15), these connection systems are released to allow the support legs 101, 101' to pivot. Without the tension lines 200, 200', 201, 201' and the support leg connection element 202 the support legs 101, 101' will naturally pivot (see FIG. 3) away from the tower 100. When tensioned, the service platform mooring lines 301, 301' prevent support legs 101, 101' from drifting away from the tower 100. The winches 303, 303' are thereby used to slowly and simultaneously release the service platform mooring lines 301, 301' thereby pivoting the support legs 101, 101' away from the tower 100 and consequently lowering the tower 100 towards the service platform 300 to a final position where the top end of the tower 100 is positioned above close to the floor of the service platform 300. Thereafter the nacelle 106 is carried by a transportation vehicle close to the top end of the tower 100. A service platform crane 302 is provided and prepared to engage and lift the nacelle 106. The nacelle tilting device 140 is actuated to align a nacelle platform 160 positioned horizontally.

Figure 8:
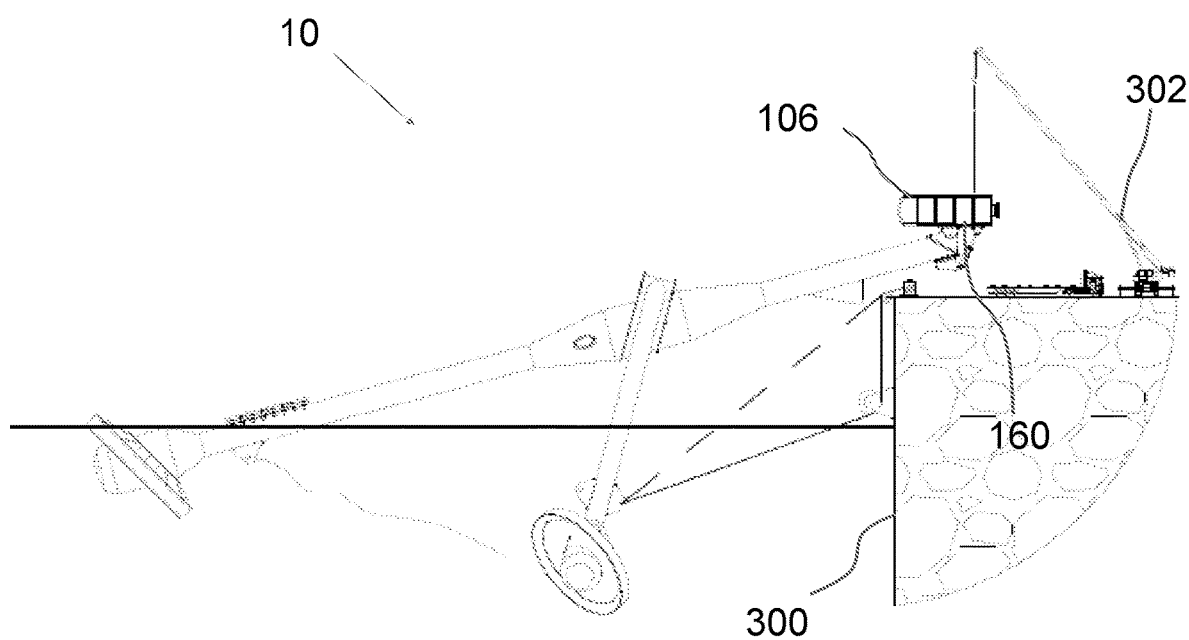
FIG. 8 is a side view of the floating foundation while installing a wind turbine generator on top of the floating foundation according to the invention.

FIG. 8 is a side view of the floating foundation 10 while installing a wind turbine generator on top of the floating foundation 10. FIG. 8 is a continuation of FIG. 7. After the steps described with reference to FIG. 7 the nacelle 106 is lifted and placed on the nacelle platform 160 where it is fixed and secured.

Figure 9:
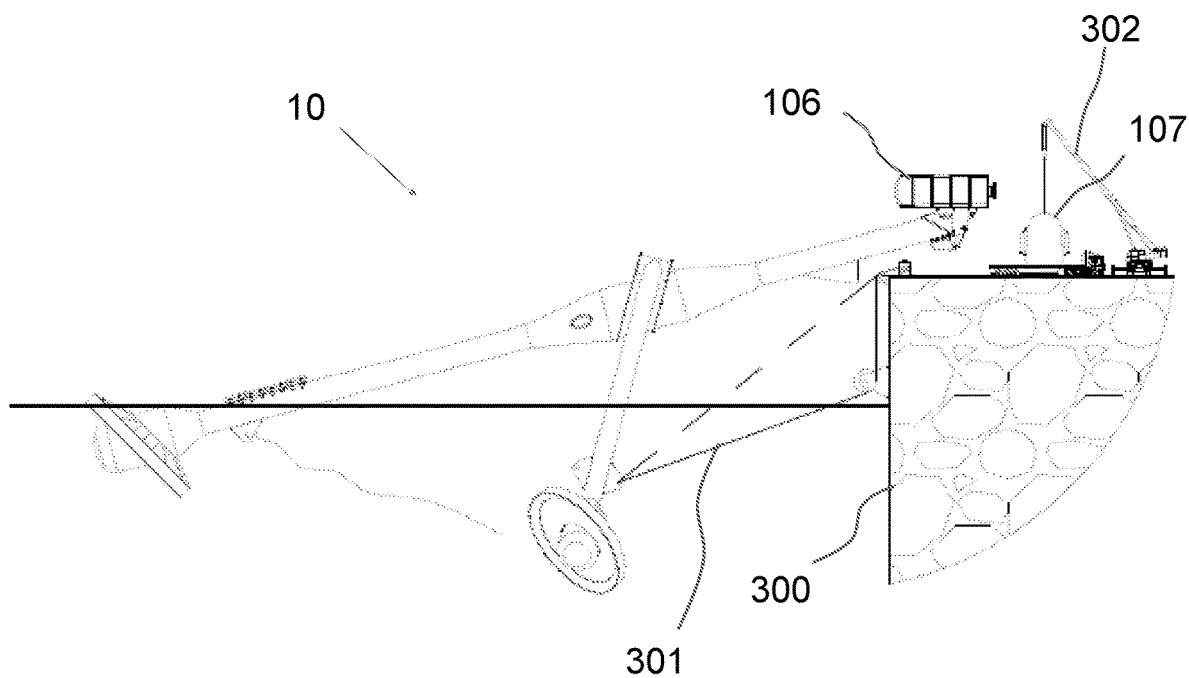
FIG. 9 is a side view of the floating foundation while installing a wind turbine generator on top of the floating foundation according to the invention.

FIG. 9 is a side view of the floating foundation 10 while installing a wind turbine generator on top of the floating foundation 10. FIG. 9 is a continuation of FIG. 8. After the steps described with reference to FIG. 8, a rotor hub 107 is transported close to the nacelle 106 and the service platform crane 302 is prepared to engage and lift the rotor hub 107 in position to be mounted to the nacelle 106. After the rotor hub 107 has been mounted to the nacelle 106, the service platform mooring lines 301, 301' is released and the floating foundation 10 is towed or moved away from the service platform 300 so that the rotor hub 107 is positioned above water and away from the service platform 300. This makes it possible to mount each turbine blade 105 (not shown) to the rotor hub 107 and rotate the rotor 360 degrees without the turbine blades colliding with the service platform 300. Each turbine blade 105 is transported close to the rotor hub 107 and the service platform crane 302 by a transportation vehicle (not shown). The service platform crane 302 is prepared to engage and lift each turbine blade 105 in position to be mounted to the rotor hub 107. After each turbine blade 105 is mounted to the rotor hub 107 and the wind turbine generator is completely assembled, the tension lines 200, 200', 201, 201' and the support leg connection element 202 are reconnected, tensioned and installed (see FIG. 7 and FIG. 2), so that the floating foundation 10 is assembled and operational as seen in e.g. FIG. 1. After the assembly is complete, the floating foundation 10 is towed offshore to site.

Figure 10:
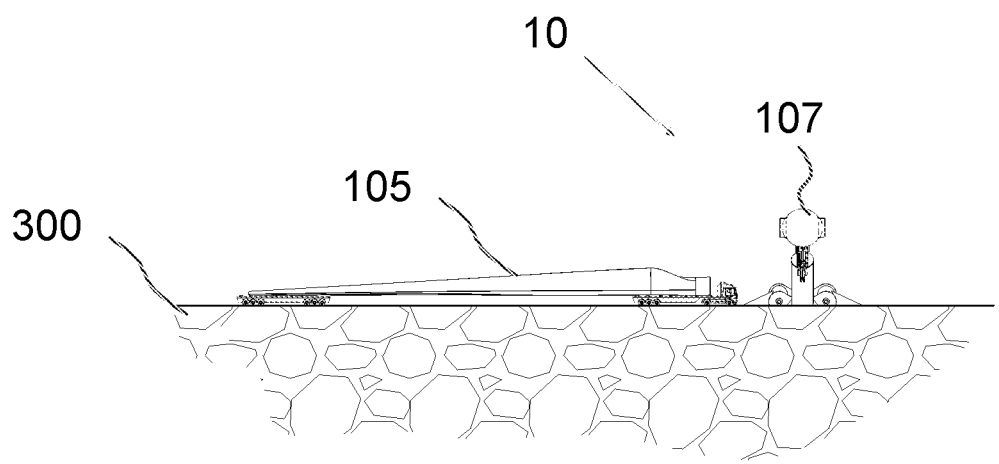
FIG. 10 is a front view of the floating foundation while installing a wind turbine generator on top of the floating foundation according to the invention.

FIG. 10 is a front view of the floating foundation 10 while installing a wind turbine generator on top of the floating foundation 10. In FIG. 10 shows a turbine blade 105 being transported close to the rotor hub 107 by a transportation vehicle on a service platform 300. The rotor hub 107 disclosed in FIG. 10 is a two blade hub, but the rotor hub 107 may also be adapted for 3 or more blades or even a single bladed hub. In case of the two blade hub, both turbine blades 105 may be mounted to the rotor hub 107 without repositioning the floating foundation 10 and rotating the rotor hub 107.

Figure 11:
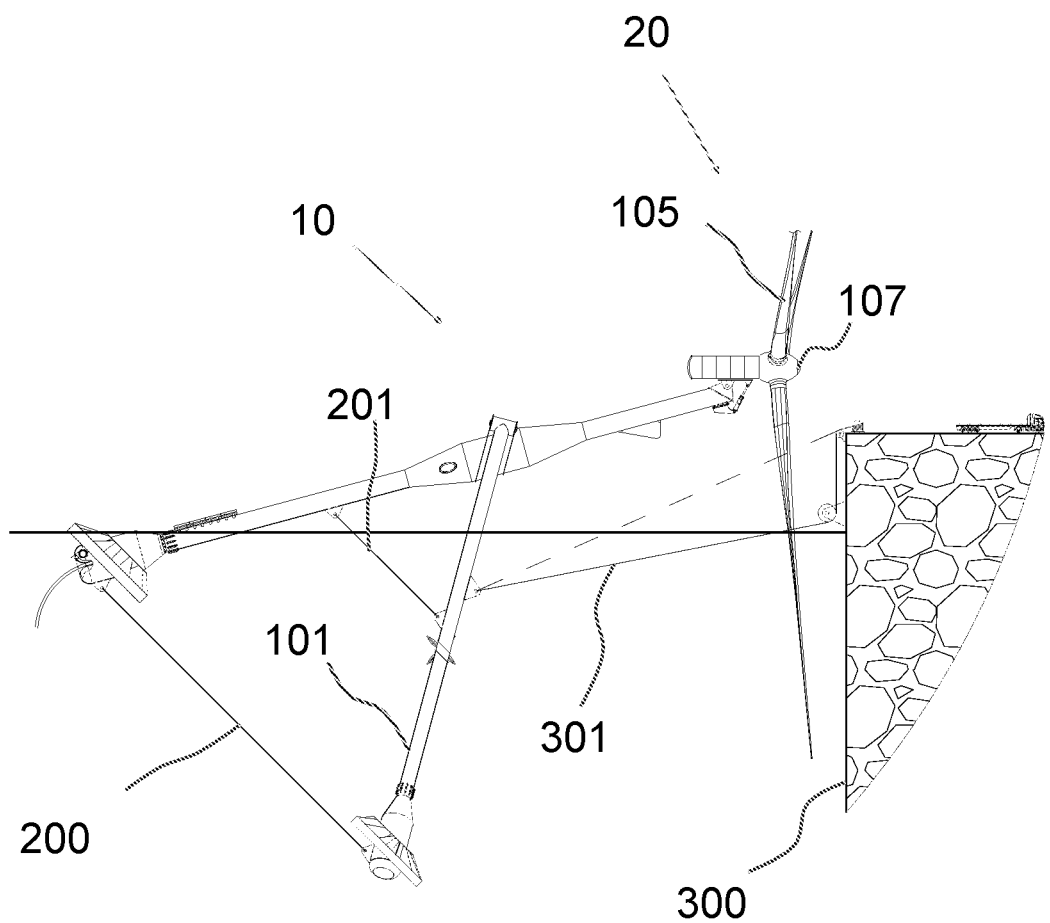
FIG. 11 is a side view of the floating foundation of the invention in a semi-submerged state.

FIG. 11 is a side view of the floating foundation 10 in a semi-submerged state. In FIG. 11 the floating foundation 10 is brought close to a service platform 300 and moored to the service platform 300. The first service platform mooring line 301 and the second service platform mooring line 301' (not shown) is released so that the rotor hub 107 is positioned above water and away from the service platform 300. This makes it possible to rotate the rotor 360 degrees without the turbine blades colliding with the service platform 300. The support legs 101, 101' may include an internal ballasting system (not shown). In FIG. 11 the support legs 101, 101' are ballasted and submerged, thereby pivoting the floating foundation 10 forward and bringing the nacelle 107 close to the edge of the service platform 300. This makes it easy to reach the wind turbine generator 20 e.g. with a crane, and perform maintenance on components of the wind turbine generator 20 without disconnecting tension lines 200, 200', 201, 201' and the support leg connection element 202. This enables easy maintenance of the wind turbine generator 20 both onshore and offshore when needed. After maintenance the support legs 101, 101' are ballasted back to its normal draft as seen in FIG. 1.

Figure 12:
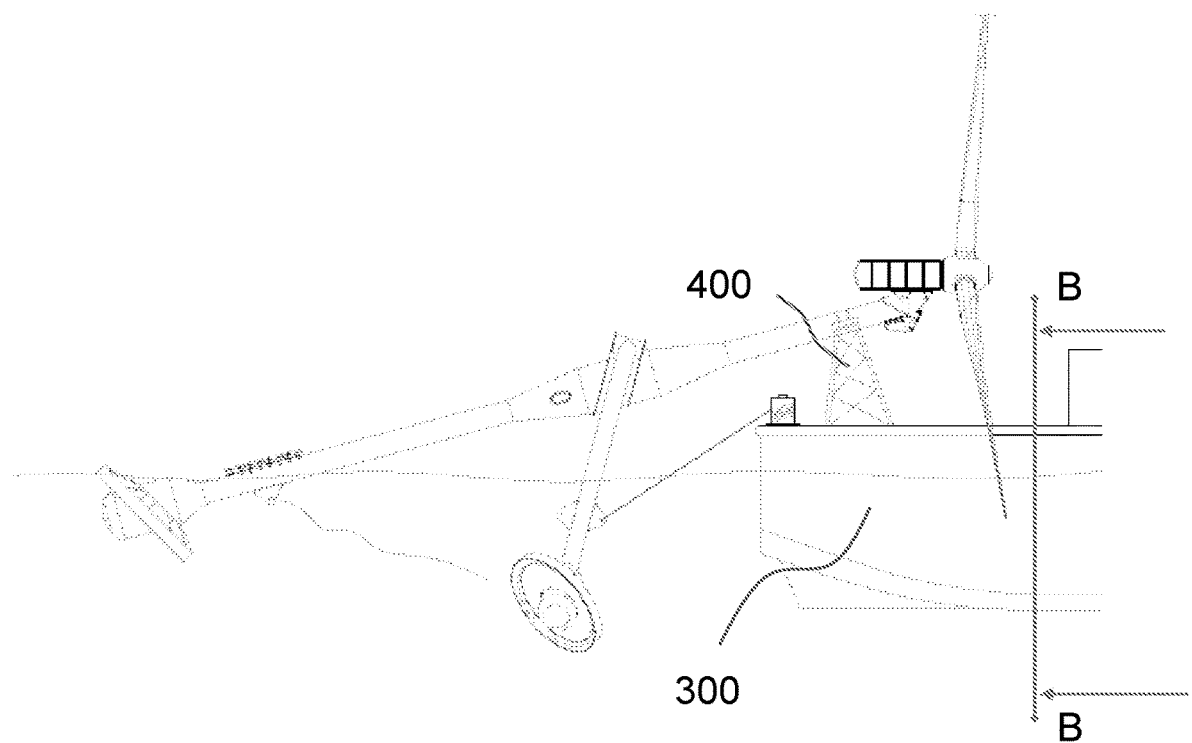
FIG. 12 is a side view of the floating foundation while installing a wind turbine generator on top of the floating foundation according to the invention.
Figure 13:
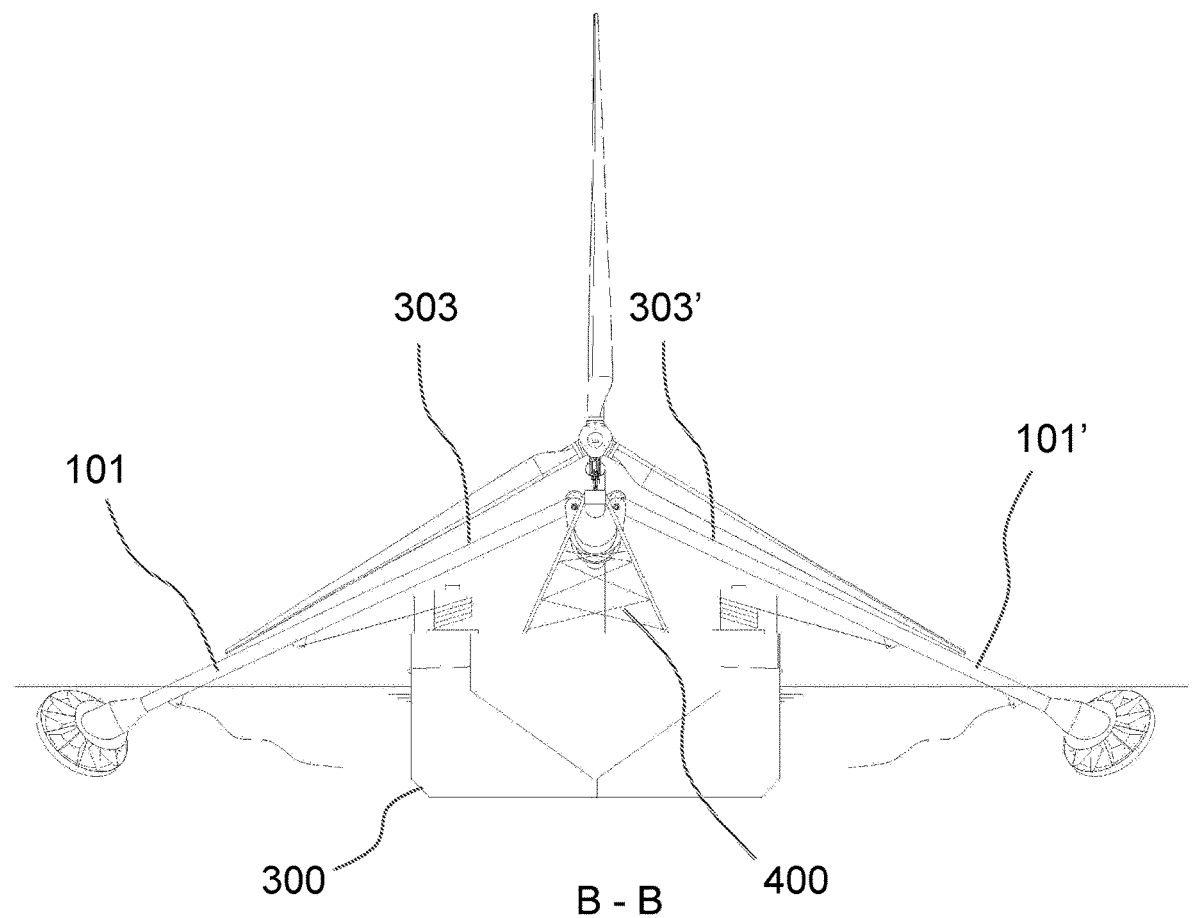
FIG. 13 shows cross section B-B indicated in FIG. 12.

FIG. 12 is a side view of the floating foundation 10 while installing a wind turbine generator on top of the floating foundation 10. In FIGS. 12-13, a floating service platform 300 is shown. In FIG. 12 the floating foundation 10 and the tower 100 is lowered against the service platform 300 and placed on top of a service platform support element 400, such as a jacket or any equivalent structure, for supporting the tower 100 while mounting a wind turbine 20 to the top end of the tower 100 in the same manner as described with regards to FIG. 7-11. This method could also be used for service or replacement of main component(s) after the foundation 10 and the WTG has been in service.

FIG. 13 shows cross-section B-B as indicated in FIG. 12. FIG. 13 clearly show the position of the first service platform winch 303 and the second service platform winch 303', as well as the service platform mooring lines 301, 301' connected to the support legs 101, 101'.

Figure 14:
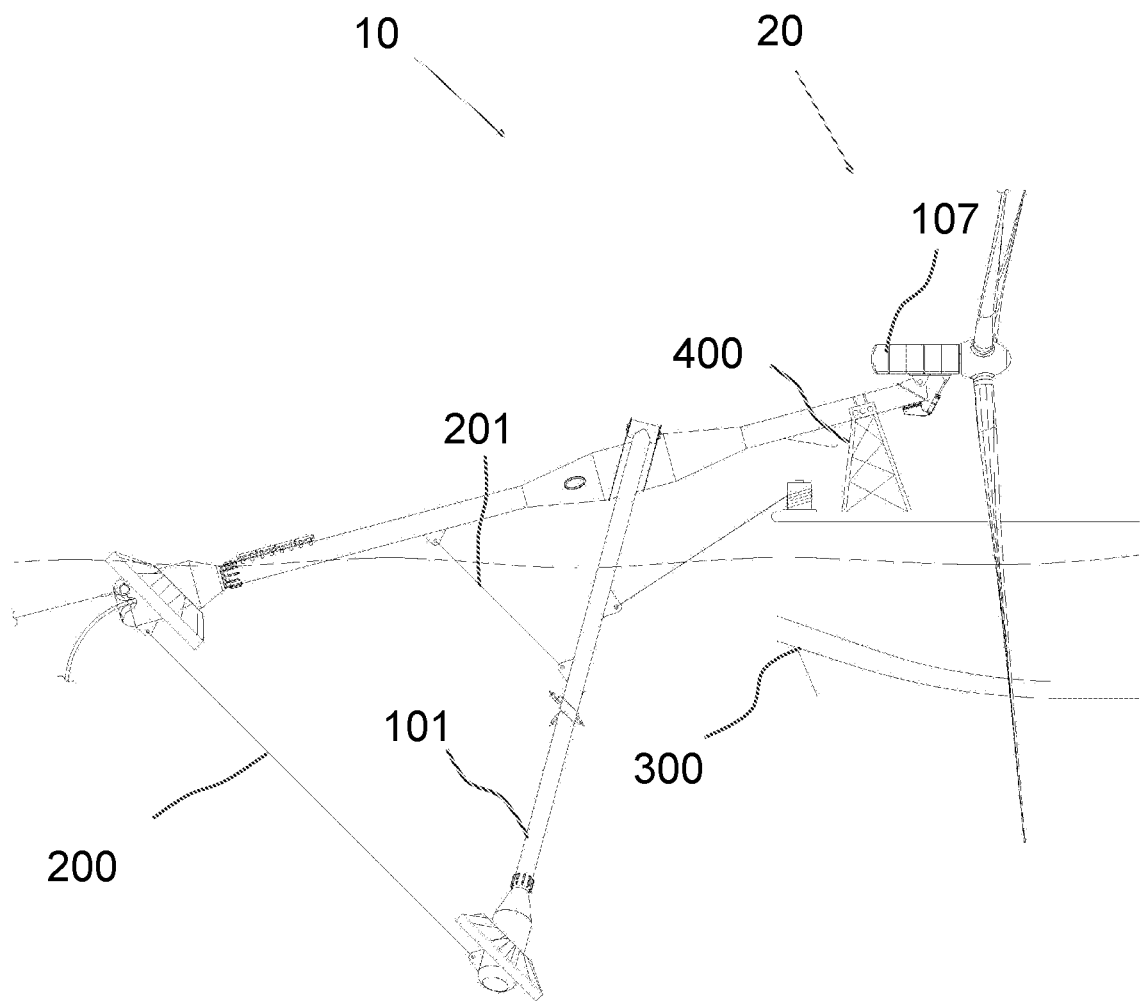
FIG. 14 is a side view of the floating foundation in a semi-submerged state mounted to a floating service platform.

FIG. 14 is a side view of the floating foundation 10 in a semi-submerged state mounted to a floating service platform 300. The support legs 101, 101' may include an internal ballasting system (not shown). In FIG. 14 the support legs 101, 101' are ballasted and submerged, thereby pivoting the floating foundation 10 forward and bringing the nacelle 107 close to the edge of the floating service platform 300. The tower 100 is placed on top of a service platform support element 400 for supporting the tower 100. This makes it possible to perform offshore maintenance on components of the wind turbine generator 20 without disconnecting tension lines 200, 200', 201, 201' (see FIG. 2) and the support leg connection element 202 (not shown). After maintenance the support legs 101, 101' are ballasted back to its normal draft as seen in FIG. 1. The floating service platform 300, e.g. shown in FIGS. 14 and 18, may be provided with a crane (not shown) for performing maintenance on components of the wind turbine generator 20.

Figure 15:
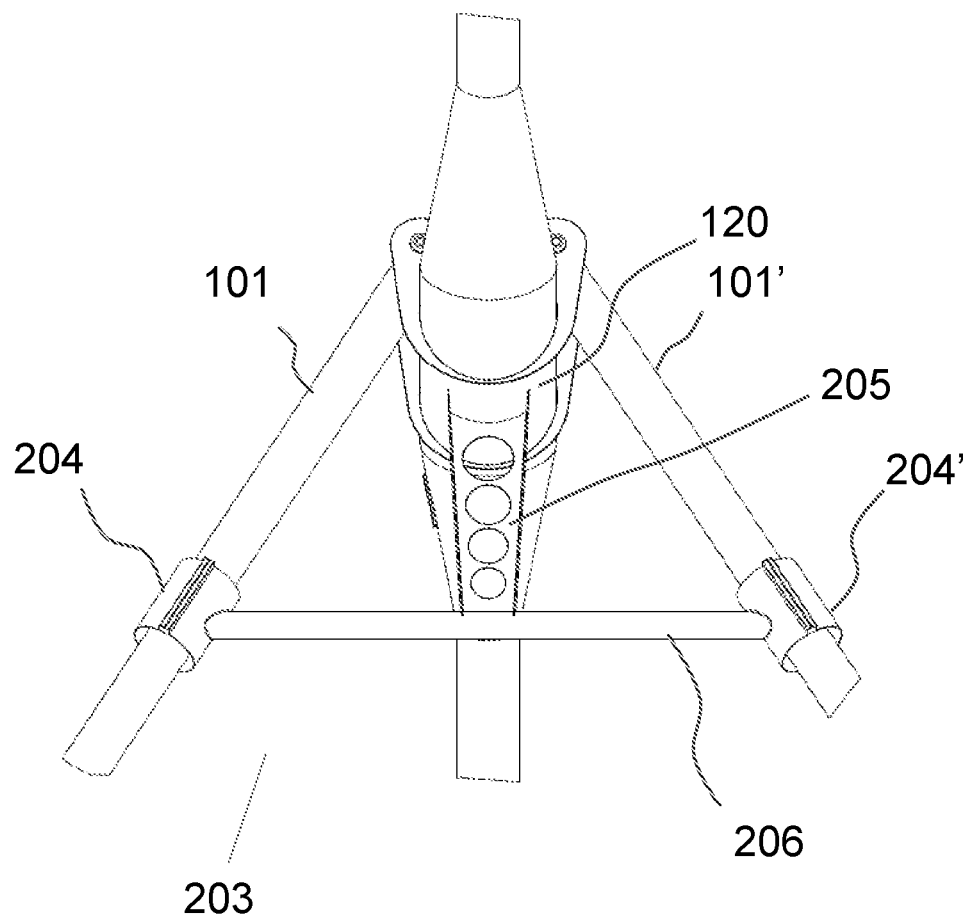
FIG. 15 is a front view cut out portion of the floating foundation according to an embodiment.

FIG. 15 is a front view cut out portion of the floating foundation 10 according to an embodiment. FIG. 15 shows an auxiliary support leg connection system 203 comprising a lateral support rod 206 connected between a first sleeve 204 connected to the first support leg 101 and a second sleeve 204' connected to the second support leg 101'. The lateral support rod 206 is connected to a support strut 205 connected between the lateral support rod 206 and the tower midsection 120. The support strut 205 may include weight reducing holes as seen in FIG. 15. The auxiliary support leg connection system 203 acts as a rigid stabilizing structure that reduces risk of yaw oscillations and prevents the support legs 101, 101' from drifting apart or moving towards each other. The sleeves 204, 204' may be releasable split sleeves or two-part sleeves allowing the auxiliary support leg connection system 203 to be disconnected from the support legs 101, 101' and re-attached when needed.

Figure 16:
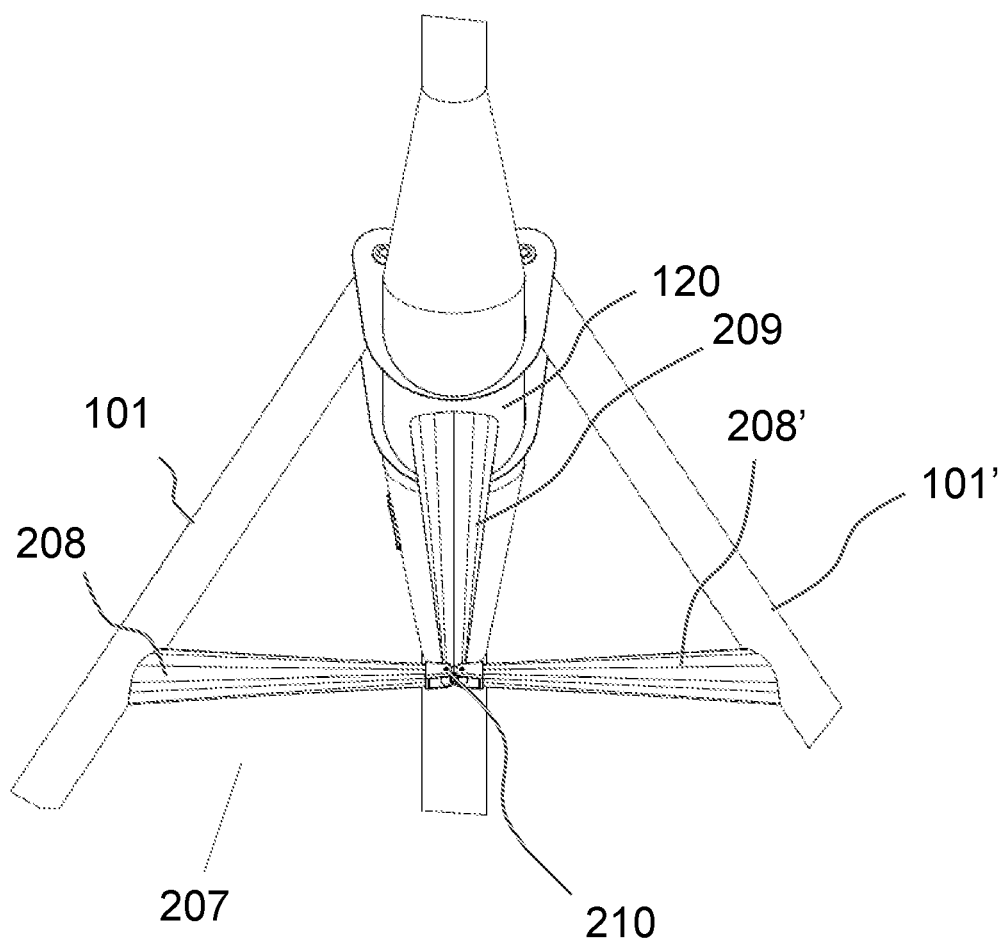
FIG. 16 is a front view cut out portion of the floating foundation according to an embodiment.

FIG. 16 is a front view cut out portion of the floating foundation 10 according to an embodiment. FIG. 16 shows an alternative support leg connection system 207 comprising a first cantilever beam 208 fixed to the first support leg 101, a second cantilever beam 208' fixed to the second support leg 101' and a third cantilever beam 209 fixed to the tower midsection 120. The cantilever beams 208, 208', 209 are releasably connected to each other via a pin lock element 210. The pin lock 210 may include one or two lock pins that lock the alternative support leg connection system 207 together. The cantilever beams 208, 208', 209 are preferably cone shaped, but may also be cylindrical. The alternative support leg connection system 207 acts as a rigid stabilizing structure and prevents the support legs 101, 101' from drifting apart or moving towards each other.

FIG. 17 is a side view of a floating foundation of the invention mounted to a land based service platform during assembly or maintenance. In FIG. 17 the floating foundation 10 is brought close to a land based service platform 300 and moored to the service platform 300. In an embodiment of the invention shown in FIG. 17 the nacelle platform tiling device 140 can be oriented vertically so that a nacelle 106 can be mounted to the nacelle platform tiling device 140 while oriented vertically. Subsequently a rotor hub 107 with or without turbine blades 105 can be mounted to the nacelle 106. The ability to align the nacelle platform tiling device 140 vertically may facilitate assembly or replacement of turbine blades, or replacement of a complete rotor in a single lifting operation. The nacelle platform tiling device 140 can also be oriented vertically so that the nacelle 106 is in a substantially vertical position even during operation (not shown). This feature can also be used to accommodate a vertical-axis wind turbine (not shown).

FIG. 18 is a side view of a floating foundation according to FIG. 17 mounted to a floating service platform 300 during assembly or maintenance. In FIG. 18 the floating foundation 10 according to an embodiment of the invention, along with the tower 100 is lowered towards the floating service platform 300 and placed on top of a service platform support element 400 in order to perform maintenance on the wind turbine generator 20. FIG. 18 shows that the nacelle platform 160 can be vertically oriented during maintenance or assembly while the floating foundation 10 is moored and lowered down onto to a floating service platform 400 which facilitates maintenance and replacement of the turbine blades.

Figure 19:
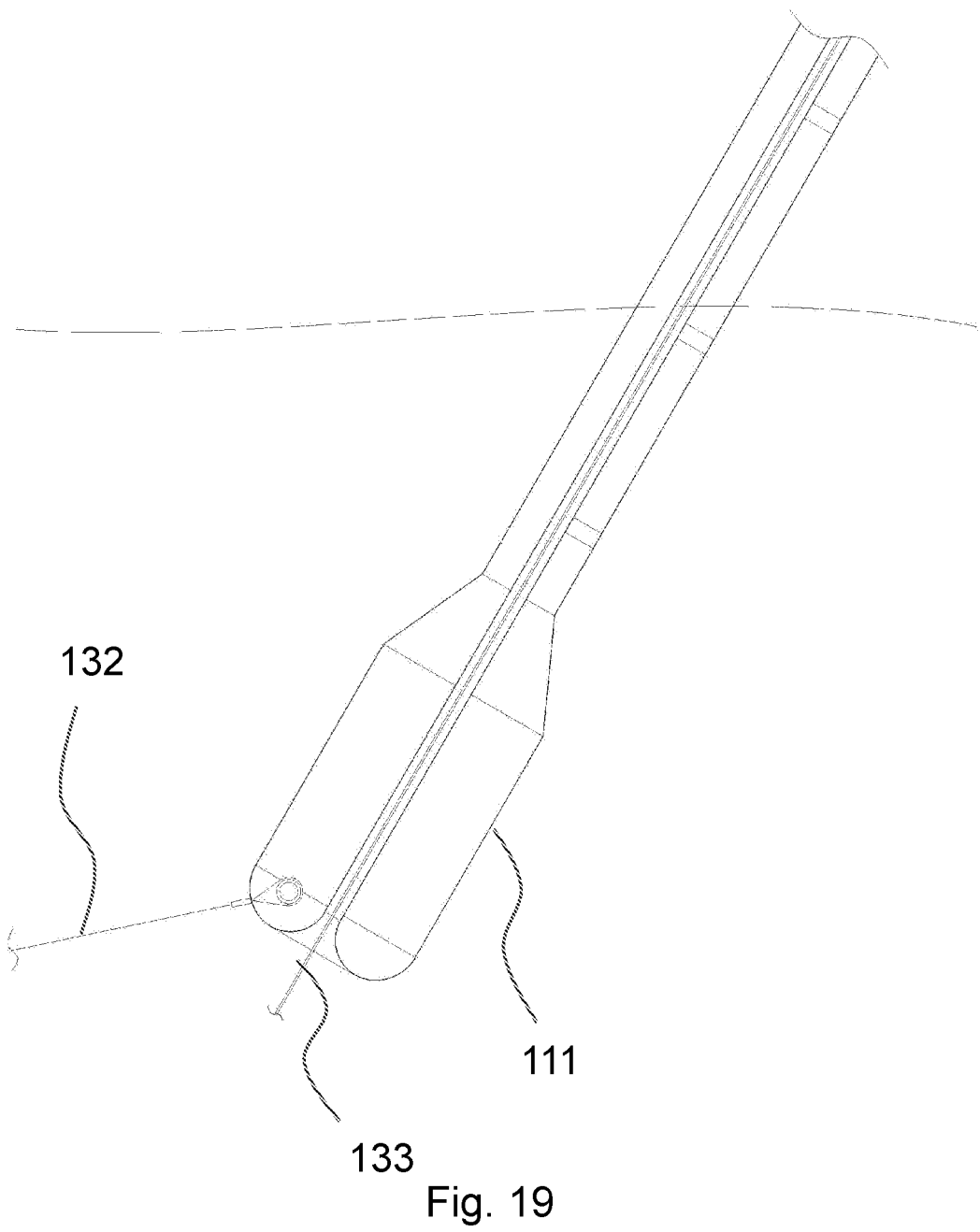
FIG. 19 is a cross-sectional view of a buoyancy member of the invention in an embodiment.

FIG. 19 is a cross-sectional view of a buoyancy member of the invention in an embodiment. FIG. 19 shows a mooring line 132 connected to a buoyancy member 111 fixed to the lower end of a support leg 101, 101' or the tower 100, preferably the tower 100, forming a tubular structure with a shaft/tunnel 134 extending axially through the buoyancy member 111 and the support leg 101, 101' and/or the tower 100. The shaft/tunnel 134 is adapted to house a power cable 133. The embodiment of FIG. 19 is advantageous in that it allows for a power cable to run inside the floating foundation 10 opposed to being run on the outside of the floating foundation 10. This makes the foundation more hydrodynamical and may prevent marine growth on the power cable 133. The power cable 133 runs inside the floating foundation 10 extending from the outside of the foundation and to the nacelle 106 primarily for conveying electricity and data signals to/from the wind turbine generator 20. The power cable 133 can be a multi-cable comprising both data cables and power cables, or it can be a bundle of separate cables comprising power and data cables.

Figure 20:
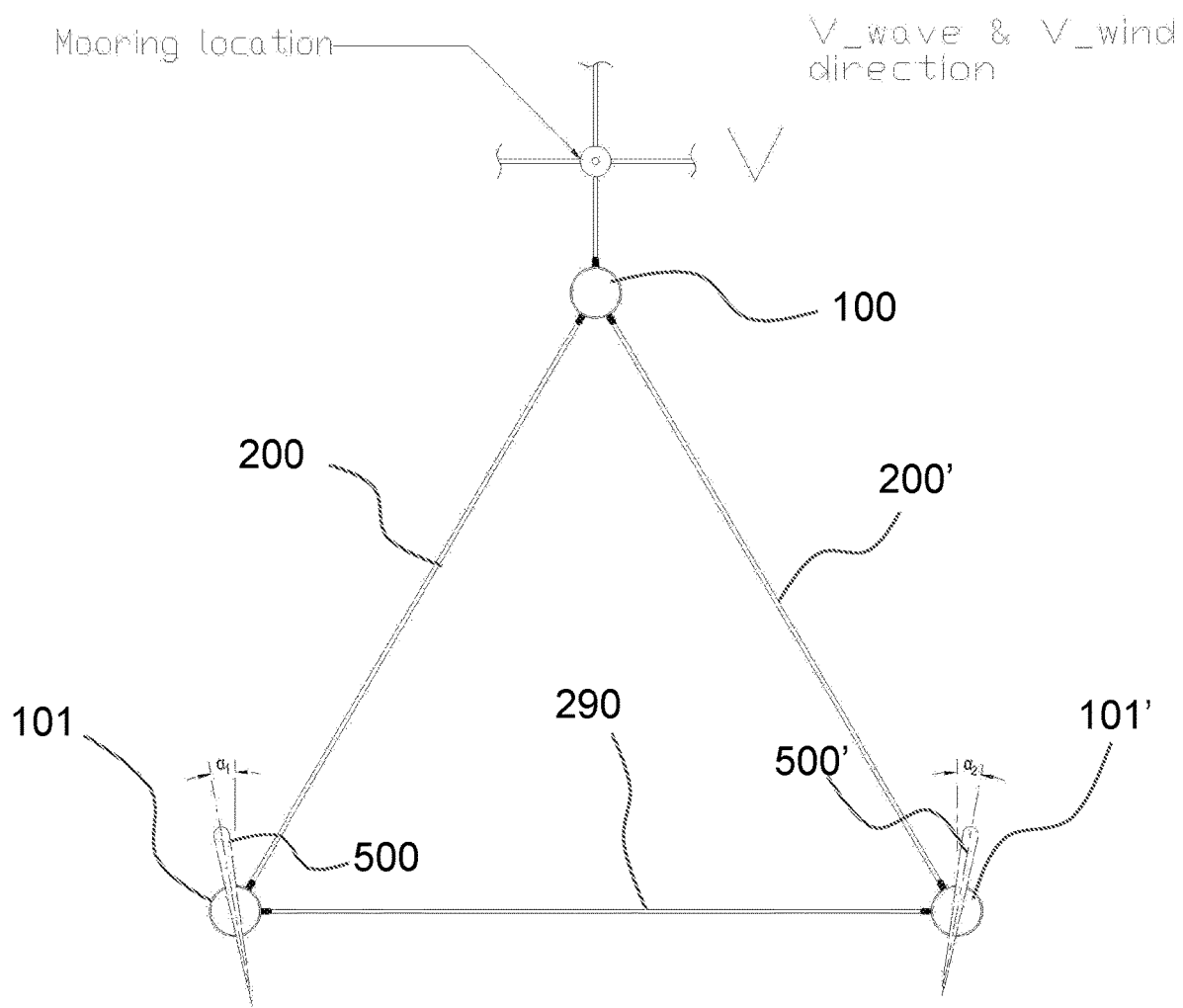
FIG. 20 is a cross sectional elevation view of an embodiment of the floating foundation of the invention.

FIG. 20 is a cross sectional elevation view of an embodiment of the floating foundation of the invention. FIG. 20 shows a cross section the tower 100, the first support leg 101 and the second support leg 101' along with the first lower tension line 200, the second lower tension line 200' and the lower auxiliary tension line 290 as shown in FIG. 2. In the embodiment shown in FIG. 20, the first support leg 101 and the second support leg 101' are respectively provided with a first rudder plate 500 and a second rudder plate 500'. The rudder plates 500, 500' are inclined an angle of $\alpha_1$ and $\alpha_2$ respectively (as seen in FIG. 20). The plates 500, 500' are aligned inward towards a centre axis of the floating foundation (not shown) parallel to the wave and wind direction as shown in FIG. 20. The rudder plates 500, 500' can be fixed to the support legs 101, 101' near the waterline or below the water line or to the support leg buoyancy elements 108, 108'. Due to the alignment of the rudder plates 500, 500', waves and currents flowing in parallel to the wave direction shown in FIG. 20 will push the rudder plates 500, 500' along with the support legs 101, 101' away from each other, but also push the rudder plates away from the tower 100 as a result of a resultant force acting in parallel to the tension line 290 and a resultant force acting in parallel to the wind direction. This brings tension to the third tension line 290 and the lower tension lines 200, 200', thereby preventing slack. This prevents the support legs 101, 101' from oscillating which stabilizes the structure during operation. The rudder plates 500, 500' may also be fixed to the support legs 101, 101' above the waterline to absorb wind flow instead of waves and currents. The rudder plates 500, 500' may be rectangular or foil shaped.

| Figure reference numbers | | | |
|---|---|---|---|
| 10 | Floating foundation | 203 | Auxiliary support leg connection system |
| 20 | Wind turbine generator | | |
| 30 | Support leg stabilizer device | 204 | First sleeve |
| 11 | Water surface | 204' | Second sleeve |
| 100 | Tower | 205 | Support strut |
| 101 | First support leg | 206 | Lateral support rod |
| 101' | Second support leg | 207 | Alternative support leg connection system |
| 103 | First support leg buoyancy member damper | | |
| | | 208 | First cantilever beam |
| 103' | Second support leg buoyancy member damper | 208' | Second cantilever beam |
| | | 209 | Third cantilever beam |
| 104 | Tower buoyancy member damper | 210 | Pin lock element |
| 105 | Turbine blade | 220 | First support leg pin joint |
| 106 | Nacelle | 220' | Second support leg pin joint |
| 107 | Rotor hub | 270 | Ship clearance area |
| 108 | First support leg buoyancy member | 221 | Fist pin joint arm |
| 108' | Second support leg buoyancy member | 221' | Second pin joint arm |
| | | 222 | Hydraulic damper |
| 110 | Tower buoyancy member | 228 | Auxiliary pin joints |
| 111 | Buoyancy member | 229 | Auxiliary rods |
| 120 | Tower midsection | 250 | Tension lines |
| 130 | Mooring line | 251 | Central pressure rod |
| 131 | Power cable | 252 | Spacers |

-continued

| Figure reference numbers | | | |
|---|---|---|---|
| 132 | Mooring line | 300 | Service platform |
| 133 | Power cable | 301 | First service platform mooring line |
| 134 | Shaft/tunnel | 301' | Second service platform mooring line |
| 140 | Nacelle tilting device | | |
| 14 | Hydraulic cylinder | 302 | Service platform crane |
| 160 | Nacelle platform | 303 | First service platform winch |
| 200 | First lower tension line | 303' | Second service platform winch |
| 200' | Second lower tension line | 400 | Service platform support element |
| 290 | Lower auxiliary tension line | 500 | First rudder plate |
| 201 | First upper tension line | 500' | Second rudder plate |
| 201' | Second upper tension line | 280 | Tilting joint |
| 202 | Support leg connection element | | |

The invention claimed is:

1. A floating foundation for wind turbine generators comprising:
a tower, a first support leg pivotally connected to a midsection of the tower, and a second support leg pivotally connected to the midsection of the tower;
means for connecting the first support leg to the second support leg;
a first support leg buoyancy member fixed to a lower end of the first support leg adapted to be completely submerged;
a second support leg buoyancy member fixed to a lower end of the second support leg-adapted to be completely submerged;
a tower buoyancy member fixed to a lower end of the tower adapted to be completely submerged;
a mooring line connected to the floating foundation around which the floating foundation is adapted to weathervane;
a nacelle platform on the top end of the tower for supporting a nacelle;
a nacelle tilting device for tilting the nacelle platform;
an auxiliary support leg connection system comprising:
a lateral support rod connected between a first sleeve connected to the first support leg and a second sleeve connected to the second support leg; and
a support strut connected between the lateral support rod and the tower midsection;
wherein the tower, the first support leg and the second support leg form a tripod-like structure;
wherein a bottom part of the midsection is located a distance above the waterline;
wherein, during operation, the angle between the tower and the first support leg is 20-100 degrees, and the angle between the tower and the second support leg is 20-100 degrees, and the angle between the first support leg and the second support leg is 20-100 degrees; and
wherein a volume between the tower, the first support leg and the second support leg is in the shape of a tetrahedron between the midsection the waterline.

2. The floating foundation according to claim 1, comprising:
a first support leg buoyancy member damper connected to the first support leg buoyancy member;
a second support leg buoyancy member damper connected to the second support leg buoyancy member; and
a tower buoyancy member damper connected to the tower buoyancy member.

3. The floating foundation according to claim 1, wherein the means for connecting the first support leg to the second support leg comprises:
a support leg connection element connected to and extending between the first support leg and the second support leg.

4. The floating foundation according to claim 1, wherein the means for connecting the first support leg to the second support leg comprises:
a lower auxiliary tension line connected to and extending between the first support leg buoyancy member and the second support leg buoyancy member.

5. The floating foundation according to claim 1 including a support leg connection system comprising:
a first cantilever beam fixed to the first support leg;
a second cantilever beam fixed to the second support leg; and
a third cantilever beam fixed to the tower midsection;
wherein the cantilever beams are releasably connected to each other via a pin lock element.

6. The floating foundation according to claim 1, comprising:
a first upper tension line connected to and extending between the tower and the first support leg above the waterline of the floating foundation;
a second upper tension line connected to and extending between the tower and the second support leg above the waterline of the floating foundation.

7. The floating foundation according to claim 1, comprising:
a first lower tension line connected to and extending between the tower and the first support leg below the waterline of the floating foundation;
a second lower tension line connected to and extending between the tower and the second support leg below the waterline of the floating foundation.

8. The floating foundation according claim 7, wherein the distance between the lower tension lines and upper tension lines is 25-50 meters and the distance between the waterline of the floating foundation and the lower tension lines is at least 5 meters.

9. The floating foundation according to claim 1, comprising:
a support leg stabilizer device adapted to couple and synchronize the pivoting motion of the support legs when either support leg is pivoted comprising:
a hydraulic damper for dampening the pivotal motion of the first support leg and the second support leg.

10. The floating foundation according to claim 1, wherein the first support leg and the second support leg are respectively provided with a first rudder plate and a second rudder plate.

11. A method of installing a wind turbine generator on top of a floating foundation according to claim 1, comprising the steps of:
towing the floating foundation to a land based or a floating service platform;
mooring the floating foundation to the service platform;
lowering the tower towards the service platform and positioning the top end of the tower close to a surface of the service platform in reach of a crane;
mounting a wind turbine generator to the top end of the tower; and
raising the tower including the wind turbine generator.

12. The method according to claim 11, wherein the step of mooring the floating foundation to the service platform, comprises:

mooring the first support leg to a first service platform winch mounted to the service platform with a first service platform mooring line;

mooring the second support leg to a second service platform winch mounted to the service platform with a second service platform mooring line.

13. The method according to claim 12, wherein the step of lowering the tower comprises:
   disconnecting a first lower tension line;
   disconnecting a second lower tension line;
   disconnecting a first upper tension line;
   disconnecting a second upper tension line;
   removing a support leg connection element;
   releasing the first service platform mooring line and the second service platform mooring line simultaneously by actuating the first service platform winch and the second service platform winch.

14. The method according to claim 13, wherein the step of raising the tower comprises:
   tensioning the first service platform mooring line and the second service platform mooring line simultaneously by actuating the first service platform winch and the second service platform winch.

15. The method according to claim 14, wherein the step of lowering the tower comprises:
   reconnecting the first lower tension line;
   reconnecting the second lower tension line;
   reconnecting the first upper tension line;
   reconnecting the second upper tension line; and
   mounting the support leg connection element.

16. A method of performing maintenance on a wind turbine generator on top of a floating foundation according to claim 1, comprising the steps of:
   towing the floating foundation to a land based or a floating service platform;
   mooring the floating foundation to the service platform;
   ballasting the first support leg and the second support leg so that the floating foundation tilts forward thereby lowering the tower towards the service platform and positioning the top end of the tower close to a surface of the service platform in reach of a crane;
   performing maintenance on the wind turbine generator.

\* \* \* \* \*